US006343249B1

(12) United States Patent
Sakai et al.

(10) Patent No.: US 6,343,249 B1
(45) Date of Patent: Jan. 29, 2002

(54) AUTOMOBILE CONTROL UNIT HAVING DIFFERENT PROGRAM MODULES

(75) Inventors: Hirotaka Sakai, Handa; Akihito Iwai, Chiryu; Kenji Suganuma, Toyokawa; Hiroshi Shibata, Kariya; Masahiro Goto, Okazaki; Minoru Okada, Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/512,460

(22) Filed: Feb. 24, 2000

(30) Foreign Application Priority Data

Mar. 10, 1999 (JP) ............................................ 11-063252

(51) Int. Cl.[7] .......................... B60Q 1/00; B60R 16/02; G06F 15/82
(52) U.S. Cl. ............................ 701/48; 701/36; 709/201; 712/28
(58) Field of Search ........................ 701/48, 102, 115, 701/36; 709/201, 202, 236, 237, 230, 246; 712/28, 29, 38; 710/105, 106

(56) References Cited

U.S. PATENT DOCUMENTS

| 5,189,617 | A | * | 2/1993 | Shiraishi ................ 364/424.05 |
| 5,696,920 | A | * | 12/1997 | Miyata et al. ............... 395/377 |
| 5,699,250 | A | * | 12/1997 | Kobayashi ........... 364/424.058 |
| 5,737,711 | A | * | 4/1998 | Abe ............................. 701/29 |
| 5,832,397 | A | * | 11/1998 | Yoshida et al. ................ 701/29 |
| 6,025,776 | A | * | 2/2000 | Matsuura ..................... 340/438 |
| 6,038,500 | A | * | 3/2000 | Weiss ............................ 701/22 |
| 6,067,612 | A | * | 5/2000 | Sasaki et al. .................. 712/28 |

FOREIGN PATENT DOCUMENTS

EP          1 026 386          8/2000

OTHER PUBLICATIONS

U.S. application No. 09476,206, filed Dec. 30, 1999, Iwai et al.

* cited by examiner

Primary Examiner—Tan Nguyen
Assistant Examiner—Dalena Tran
(74) Attorney, Agent, or Firm—Nixon & Vanderhye P.C.

(57) ABSTRACT

An ECU is provided with a microcomputer for performing arithmetic operation for controlling a control target by executing a program stored in a ROM and for performing the process to transmit the control data calculated by means of the arithmetic operation to a communication target. The program comprises independent program modules, that is, a program (application unit) for performing the arithmetic operation, a program (communication conversion unit) for extracting the control data to be transmitted from among the control data calculated by the application unit and for performing the process to convert the extracted control data to the communication data string corresponding to the communication protocol of the communication target, and a program (communication driver unit) for performing the process to transmit the data string according to the communication protocol.

23 Claims, 14 Drawing Sheets

FIG. 4

| Handle No. | COMMON MEMORY ADDRESS | COMMON MEMORY SIZE | COMMON PACKET DATA SIZE | PACKET No. | COMMON PACKET DATA | LSB CONVERSION CALL ADDRESS |
|---|---|---|---|---|---|---|
| Handle 1 | $FFFF0000 | 2byte | 2byte | PN 1 | 0 | $00001000 |
| Handle 2 | $FFFF0002 | 2byte | 1byte | PN 1 | 6 | $00001100 |
| Handle 3 | $FFFF0004 | 1byte | 1byte | PN 1 | 2 | $00010000 |
| Handle 4 | $FFFF0005 | 1byte | 1byte | PN 1 | 3 | $00101000 |
| | | | | | | |
| Handle 11 | | 2byte | 2byte | PN 2 | 0 | $00001000 |
| Handle 12 | | 2byte | 1byte | PN 2 | 4 | $00001100 |
| | | | | | | |
| Handle 20 | $FFFF0010 | 2byte | 2byte | PN 3 | 0 | $00001110 |
| Handle 21 | $FFFF0012 | 1byte | 1byte | PN 3 | 4 | $00001111 |
| | | | | | | |
| Handle N | | | | PN m | | |

FIG.5

| PACKET No. | COMMUNICATION SYSTEM | COMMON PACKET DATA MESSAGE LENGTH | INDIVIDUAL PACKET DATA MESSAGE LENGTH | HEADER INFORMATION |
|---|---|---|---|---|
| PN 1 | CAN | 12byte | 8byte | Arbitration=0X123 ML=08 |
| PN 2 | SCI | 12byte | 14byte | ID=1 ML=16 |
| PN 3 | CAN | 12byte | 8byte | Arbitration=0X124 ML=08 |
| PN 4 | CAN | 24byte | 8byte | Arbitration=0X125 ML=08 |
| PN 30 | SCI | | | |
| PN 31 | DMA | | | |
| PN 32 | DMA | | | |

AUTOMOBILE CONTROL UNIT HAVING DIFFERENT PROGRAM MODULES

CROSS REFERENCE TO RELATED APPLICATION

This application relates to and incorporates herein by reference Japanese Patent Application No. 11-63252 filed on Mar. 10, 1999.

BACKGROUND OF THE INVENTION

The present invention relates to an automobile control unit provided with a microcomputer, and more particularly relates to an automobile control unit provided with a microcomputer that communicates data with other microcomputers in other automobile control units to thereby share the control data with communicated microcomputers.

An automobile control unit for controlling a control target such as an engine or transmission mounted on an automobile is provided with a microcomputer for performing arithmetic operations for controlling control targets by executing control programs stored in a ROM.

Recently, the control algorithm has become complex, and in such an automobile control unit, a microcomputer mounted on an automobile control unit communicates the data with other microcomputers of other automobile control units to thereby share the control data used for controlling control targets with communicated microcomputers. Thus, the controllability is improved.

Various communication system structures of an automobile control unit (ECU) are known. One exemplary system uses an in-ECU communication system structure for communicating the data one-to-one between two microcomputers mounted on one ECU. Another exemplary system uses an inter-ECU serial communication system structure for communicating the data one-to-one between respective microcomputers mounted on ECUs through a serial communication line provided in an automobile. A still another exemplary system uses an inter-ECU multiple communication system structure for communicating the data one-to-many or many-to-one among microcomputers mounted on respective microcomputers mounted on three or more ECUs through a multiple communication line provided in an automobile.

Furthermore, a system structure having the above systems is also known. For example, the system structure in which a microcomputer mounted on one ECU communicates the data with another microcomputer mounted on the same ECU and also communicates the data with a microcomputer mounted on another ECU through a serial communication line or a multiple communication line has been known.

As described above, various system structures that are different in the communication type are employed for the automobile control unit of this type. Furthermore, various communication protocols are employed even though the communication type of the system structure is the same, and particularly many communication protocols are used for multiple communication. Even though the communication type system structure and the communication protocol are the same, the system structure difference in the allotment of a control part depending on the sender microcomputer and receiver microcomputer and the type of controlling data, and the control data difference in the type of control data to be communicated, data length, and arrangement of control data of the communication data string actually communicated are factor in the additional variation.

However, in the above automobile control unit, a program to be executed by a microcomputer includes a part for the arithmetic operation for controlling the target to be controlled and a part for performing communication operation of the control data to be communicated between communication targets, and these parts are not defined clearly and are formed inseparably.

Therefore, in such automobile control units, the whole program must be widely modified in the wide range every time when the communication type or control part allotment of the system structure or communication protocol is changed. Furthermore, it is difficult to reuse a program that has been developed for the purpose of a certain unit having a certain system structure for another unit having another system structure.

For example, in the above automobile control unit, a control program that is provided for control arithmetic operation depending on the control target is used not only for calculation of the control data but also for conversion of the calculated control data to the communication data string corresponding to the communication protocol between communication targets. The communication data string is transmitted with transmission timing determined according to the communication protocol or baud rate. On the other hand, the communication data string transmitted from a communication target by means of the control program is received at the timing determined according to the communication protocol or baud rate, the control data included in the communication data string is written in a memory area that will be referred to when arithmetic operation is performed. Therefore, if the communication protocol to the communication target or the data type or data length of the control data to be communicated is changed, the whole program must be modified.

SUMMARY OF THE INVENTION

It is the object of the present invention to provide an automobile control unit that minimizes the modification of a program to be executed by a microcomputer when the system structure or communication protocol is changed.

According to the present invention, independent program modules include a data conversion program and a communication driver program, which are provided separately from the application program for performing the control arithmetic operation corresponding to a control target. The modules convert the control data to be transmitted to a communication target to a communication data string corresponding to a communication protocol, and transmit the communication data string to the communication target according to the communication protocol. Therefore, it is not necessary to modify the application program even though the communication protocol is changed, or the data type or data length of the control data to be transmitted to the communication target or the arrangement of the control data in the communication data string is changed.

Only the data conversion program need be modified and it is not necessary to modify the communication driver program and application program as long as the communication protocol is the same even though the type or data length of the control data to be transmitted to the communication target or the arrangement of the control data in the communication data string is changed concomitantly with the system structure change.

BRIEF DESCRIPTION OF THE DRAWINGS

Other objects, features and advantages of the present invention will become more apparent from the following detailed description made with reference to the accompanying drawings. In the drawings:

FIG. 4 is a table describing first table data stored in a table storage unit;

FIG. 5 is a table describing second table data stored in the table storage unit;

DETAILED DESCRIPTION OF THE PREFERRED EMBODIMENT

An automobile control system in accordance with an embodiment to which the present invention is applied is described in detail hereinafter with reference to the figures.

Figure 1:
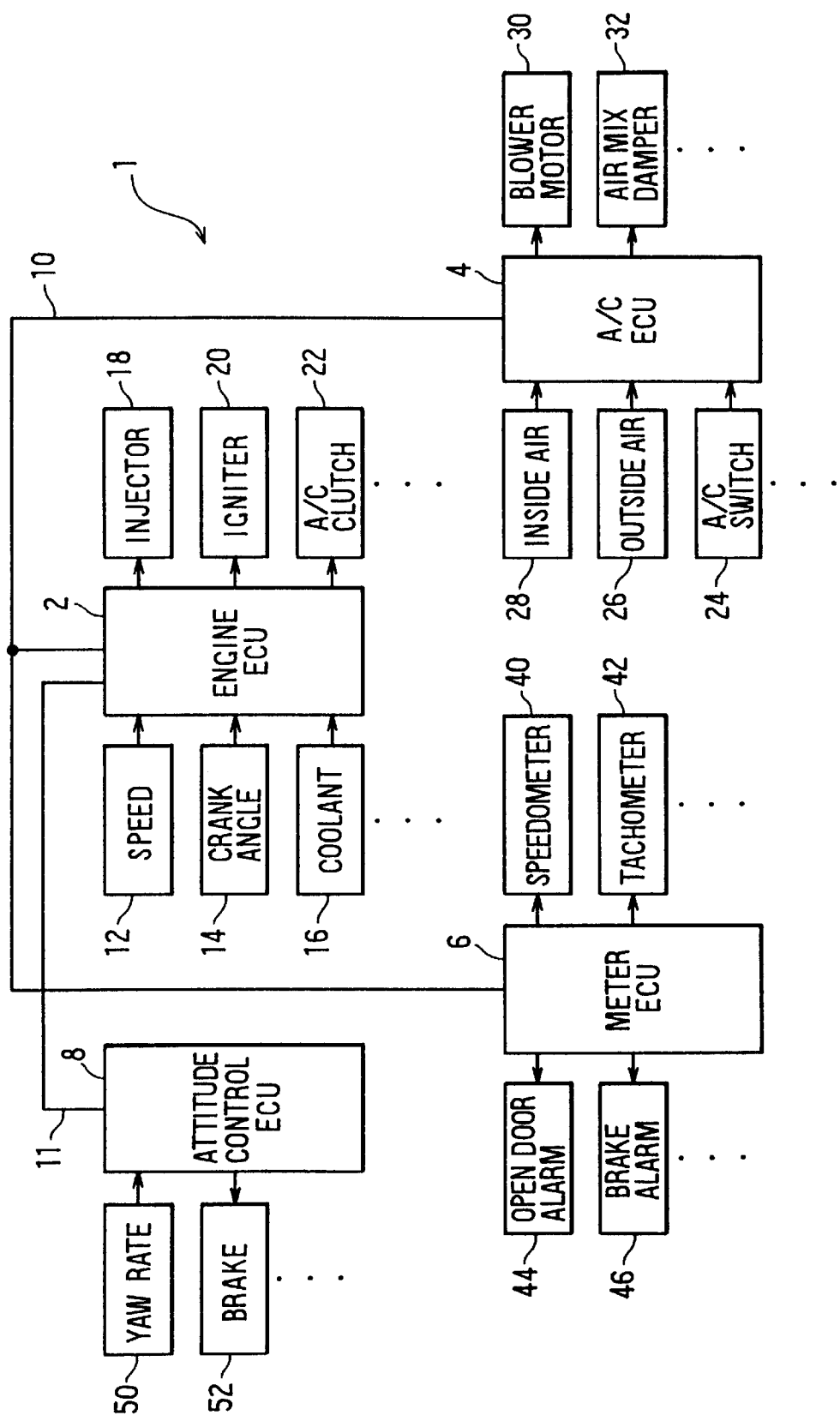
FIG. 1 is a block diagram illustrating an automobile control system in accordance with an embodiment of the present invention.

FIG. 1 is a structural diagram for illustrating the structure of an automobile control system 1 in accordance with an embodiment. The automobile control system 1 in accordance with the present embodiment controls an engine, a transmission, an air conditioner, instrument, a brake, and other electrical equipment.

As shown in FIG. 1, the automobile control system 1 in accordance with the present embodiment is provided with an electronic control unit (engine ECU) 2 for mainly controlling the engine and transmission, an electronic control unit (air conditioner ECU) 4 for controlling an air conditioner, an electronic control unit (meter ECU) 6 for controlling meters and alarm lamps in a meter panel, and an electronic control unit (attitude control ECU) 8 for controlling the automobile attitude to prevent unstable side slipping of an automobile.

The engine ECU 2, air conditioner ECU 4, and meter ECU 6 are connected each other though a multiple communication line 10 communicatively. The engine ECU 2 is one-to-one connected to the attitude control ECU 8 so as to perform serial communication through a serial communication line 11 other than the multiple communication line 10. The communication protocol through the multiple communication line 10 is different from the communication protocol through the serial communication line 11.

The engine ECU 2 detects the operation status of the automobile based on detection signals transmitted from various sensors such as a speed sensor 12 for detecting the automobile speed SPD, a crank angle sensor 14 for detecting the engine speed (rotation speed Ne), and a coolant temperature sensor 16 for detecting the cooling water temperature of the engine (cooling water temperature THW). The engine ECU 2 controls the engine and transmission so as to be in optimal condition by driving an injector 18, an igniter 20, and other actuators not shown in the figure based on the detection results and the outside air temperature TAM data transmitted from the air conditioner ECU 4 as described hereinafter.

Furthermore, the engine ECU 2 transmits the control data that indicates the operation status such as the automobile speed SPD, rotation speed Ne, and cooling water temperature THW, which are detected as described above, to the multiple communication line 10 and the serial communication line 11 properly, and controls the engine to transmit the driving force of the engine to a coolant compressor of the air conditioner to activate the cooling operation of the air conditioner by actuating an A/C magnet clutch 22 in response to the air conditioner control data AC transmitted from the air conditioner ECU 4 as described hereinafter.

On the other hand, the air conditioner ECU 4 detects the air temperature outside the automobile (outside air temperature) TAM and the air temperature inside the automobile (inside air temperature) based on the detection signal from an outside air sensor 26 and an inside air sensor 28 and transmits the detection result data, and actuates a blower motor 30 and an air mix damper 32 for switching air distribution depending on the detection results and the data for indicating the automobile speed SPD, rotation speed Ne, and cooling water temperature THW transmitted from the engine ECU 2, and controls the air conditioning in the inside. The air conditioner ECU 4 transmits the air conditioner control data AC to the engine ECU 2 to actuate the A/C magnet clutch 22 when an air conditioner switch 24 is turned on by an automobile driver.

The meter ECU 6 actuates a speedometer 40, a tachometer 42, and a cooling water temperature meter (not shown in the figure) in the meter panel corresponding to the data that indicates the automobile speed SPD, rotation speed Ne, and cooling water temperature THW transmitted from the engine ECU 2. Furthermore, the meter ECU 6 lights an open door alarm lamp 44 for indicating that a door is open and a brake alarm lamp 46 for indicating that a parking brake is pulled up based on the signal from each door switch that is turned on/off depending on opening/closing of each door of the automobile and the signal from a parking brake switch that is turned on while the parking brake of the automobile is being pulled up.

On the other hand, the attitude control ECU 8 detects the running condition of the automobile based on the signal from various sensors such as a yaw rate sensor 50, and actuates a brake actuator 52 to control the brake and transmits the control data (for example, fuel cut signal) to reduce the engine output to the engine ECU 8 through the serial communication line 11 when the attitude control ECU 8 determines the automobile to be in skidding. At that time, the engine ECU 2 actuates the injector 18 according to the control data supplied from the attitude control ECU 8 to reduce the engine output.

ECUs 2, 4, 6 and 8 are provided with respective microcomputers, each microcomputer executes a program to realize the operation of the ECUs 2, 4, 6 and 8.

Figure 2:
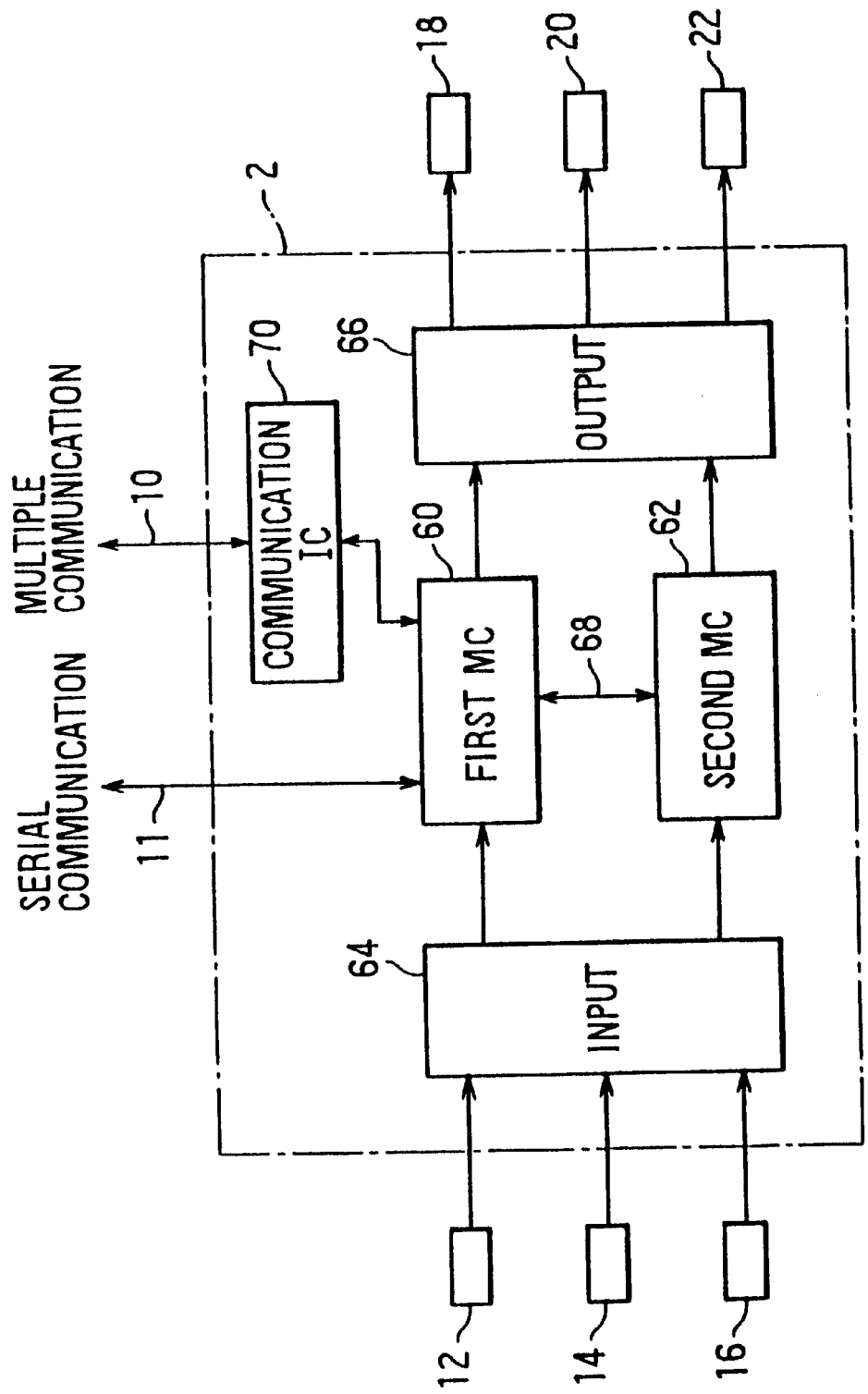
FIG. 2 is a block diagram illustrating an engine ECU that is a component of the automobile control system shown in FIG. 1.

Next, FIG. 2 is a block diagram for illustrating the internal structure of the engine ECU 2.

As shown in FIG. 2, the engine ECU 2 is provided with two microcomputers that is, a first microcomputer 60 and a second microcomputer 62. The microcomputers 60 and 62 are ordinary single chip microcomputers respectively, each single microcomputer is provided with a CPU, a ROM served as a memory medium for storing the data temporarily, and an input/output port. In the present embodiment, each RAM of the microcomputers 60 and 62 is a RAM that stores 1 byte data (8 bits) per 1 address.

The microcomputers 60 and 62 receive the signal from the various sensors 12, 14, and 16 by way of an input circuit 64, execute the arithmetic operation for controlling control targets based on the input signal, and send out the control magnitude signal to an output circuit 66 to thereby actuates various actuators such as the injector 18 and igniter 20.

The first microcomputer 60 and the second microcomputer 62 communicate the control data to each other through a communication line 68 to hold the control data for controlling control targets in common. That is, the first microcomputer 60 and the second microcomputer 62 share and execute the arithmetic operation for controlling the engine and transmission, and hold the control data used individually for the arithmetic operation in common by means of communication through the communication line 68. The communication protocol communicated through this communication line 68 is DMA communication and different from the communication protocol communicated through the multiple communication line 10 and serial communication line 11.

Furthermore, the engine ECU 2 is provided with a communication IC 70, the communication IC 70 transmits the communication data string supplied from the first microcomputer 60 to the multiple communication line 10 as the transmission signal, and sends out the interruption signal to the first microcomputer 60 every time when the predetermined frame (in the present embodiment, one frame data) of the communication data string transmitted from the air conditioner ECU 4 and the meter ECU 6 through multiple communication line 10 is received.

The above-mentioned serial communication line 11 is connected to the input/output port of the first microcomputer 60, the first microcomputer 60 one-to-one communicates with the attitude control ECU 8 (in detail, a microcomputer in the attitude control ECU 8) by way of the input/output port.

Figure 3:
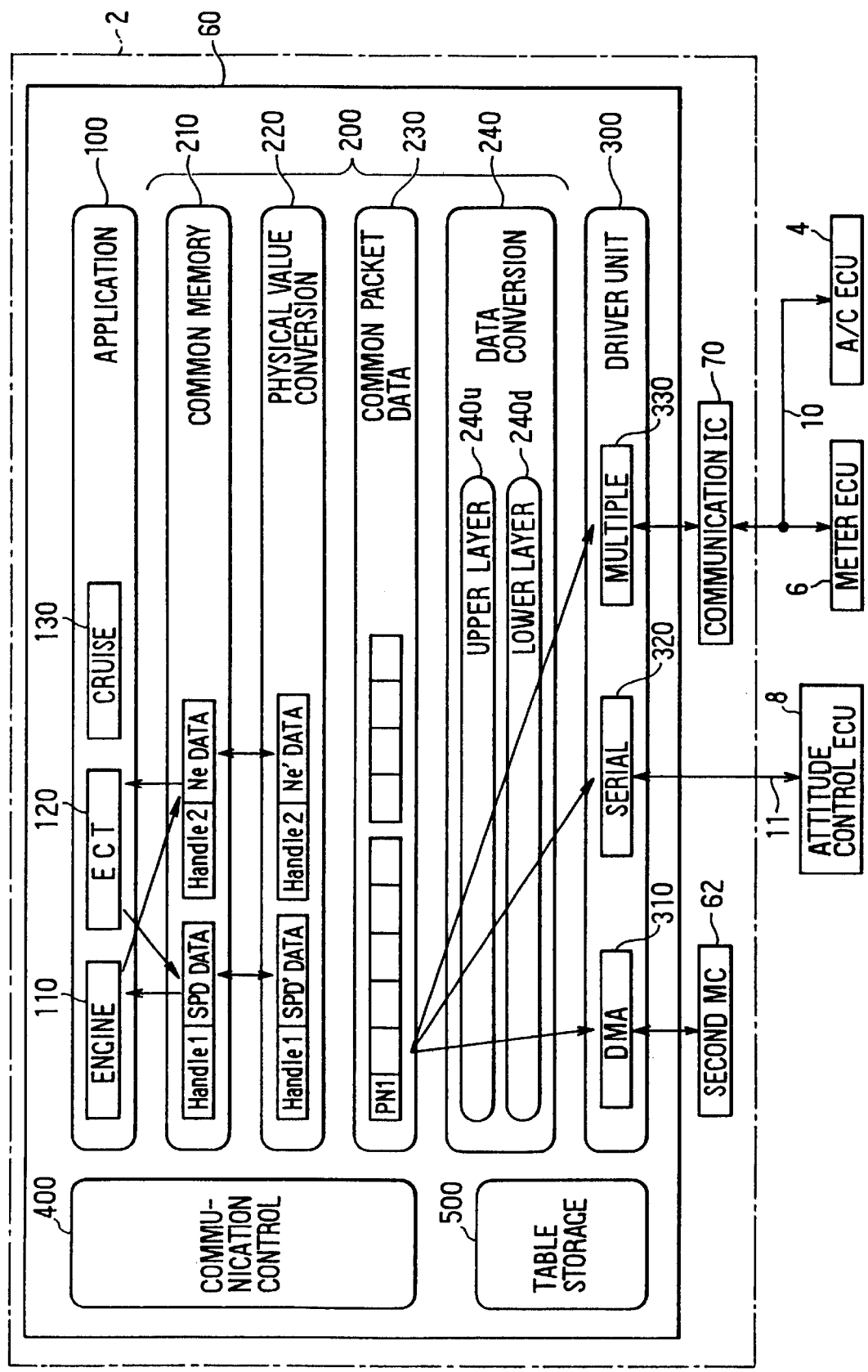
FIG. 3 is a conceptual diagram schematically illustrating an communication model in a first microcomputer provided in the engine ECU.

Next, FIG. 3 is a conceptual diagram for illustrating an imaginary communication model in the first microcomputer 60, and this communication model has the hierarchy structure based on ISO/OSI (Open System Interconnection) communication model.

As shown in FIG. 3, the communication model employed in the first microcomputer 60 of the present embodiment comprises an application unit 100 for performing arithmetic operation for controlling the control target, a communication driver unit 300 for communication of the data with the second microcomputer 62 and other ECUs 4, 6 and 8, and a communication conversion unit 200 for generating the communication data string, which the communication driver unit 300 will transmit, from the control data calculated by the application unit 100 and converting the communication data string received by the communication driver unit 300 to the control data that is usable by the application unit 100. The conversion unit 200 is classified usually into a common memory (shared memory) unit 210, a physical value conversion unit 220, and a common packet data unit 230, and a communication data conversion unit 240.

Furthermore, the first microcomputer 60 is provided with a communication control unit 400 and a table storage unit 500. The application unit 100 does not transfer the data directly to the second microcomputer 62 or other ECUs 4, 6 and 8, but transfers the data successively from the top layer to the bottom layer through the hierarchy (imaginary communication) to realize physical communication to the outside (communication target) by way of the communication driver unit 300. Each hierarchy of the communication model requests the service to the lower hierarchy and the lower hierarchy provides the service to the higher hierarchy, and the purpose of each hierarchy is to hide the detailed information such as actual communication specification to the service in the higher hierarchical layer.

In the present embodiment, the program in the ROM executed by the microcomputers 60 and 62 is programmed according to the object orientation in which the whole function of the program is divided into unit functions and an object is given to each unit function, and the object is a program module comprising combined data and a program called as "method" that is a sequence to process the data.

Addressing only the software in the communication model shown in FIG. 3, the units 100 to 400 other than the table storage unit 500 are objects (methods and data) stored in the ROM of the first microcomputer 60. The table storage unit 500 is a memory area where tables described hereinafter with reference to FIG. 4 and FIG. 5 in the ROM of the first microcomputer 60 are stored.

Furthermore, in the description of the present embodiment, the action expression having the subject of an object, for example, "the common memory unit 210 performs . . . " or "the physical value conversion unit 220 performs . . . ", actually means that a functional means that the first microcomputer 60 realizes by operating according to the method of the object (that is, the first microcomputer 60 executes the method of the object) performs the operation of the ". . . ". Similarly, the passive action expression by the object, for example, ". . . is performed by the common memory unit 210" or ". . . is performed by the physical value conversion unit 220" actually means that the operation of the ". . . . " is performed by the functional means that the first microcomputer 60 realizes by operating according to the method of the object.

The application unit 100 comprises objects that are formed by dividing the control target and control algorithm of the engine ECU 2 into individual control targets and control algorithms. In the present embodiment, the application unit 100 is provided with an object (engine application software) 110 that calculates the control data such as the rotation speed Ne and performs arithmetic operation for controlling the engine based on the calculated control data, an object (ECT application software) 120 that calculates the control data such as automobile speed SPD and performs arithmetic operation for controlling the transmission based on the calculated control data, and an object (cruise application software) 130 that calculates the control data such as throttle opening of the engine and performs throttle opening control arithmetic operation to keep the automobile in constant speed running based on the calculated control data. An application software among these application software 110, 120, and 130 uses the control data calculated by other application software in arithmetic operation performed by this application itself. That is, these application software 110, 120, and 130 use the control data commonly with each other.

The common memory unit 210 writes the control data commonly used by the application software 110, 120, and 130 and the control data (external common data) in the common memory set as the specific memory area other than the control data memory area, the control data memory area is the memory area (equivalent to the memory means, and control data memory area) for temporarily storing all the control data used for controlling the control target by the application software 110, 120, and 130 of the application unit 100 in the RAM provided in the first microcomputer 60.

An identification number (Handle number) for indicating the data type is assigned to each of the data stored in the common memory, and an object specifies a Handle number in order to obtain necessary data from the common memory or in order to store new data in the common memory.

FIG. 3 shows an example in which the automobile speed SPD data calculated by the ECT application software 120 and having the Handle number "1" is used also by the engine application software 110, and on the other hand, the rotation speed Ne data calculated by the engine application software 110 and having the Handle number "2" is used also by the ECT application software 120. In the figures following FIG. 3 and the description in the following, "Handle 1" or "Handle 2" refers to the Handle number of "1" or "2" respectively.

When the data is transmitted from the first microcomputer 60 to the external (for example, the second microcomputer 62 or other ECUs 4, 6 and 8), the physical value conversion unit 220 performs LSB conversion, LSB conversion is an operation for converting the data length (the physical value represented by the data per LSB, that is, data accuracy) of the data to the data length employed by the transmission destination, on the control data to be transmitted among control data stored in the common memory to convert the data length of the data to be transmitted to the data length employed by the transmission destination.

Furthermore, when the physical value conversion unit 220 receives the data from the external (for example, the second microcomputer 62 and other ECUs 4, 6 and 8), the physical value conversion unit 220 performs LSB conversion on the received control data to convert the data length to the data length that is employed by the application software 110, 120, and 130 of the application unit 100.

The above-mentioned LSB conversion program is stored in a predetermined area of the ROM.

When the data is transmitted from the first microcomputer 60 to the external, the common packet data unit 230 collects and arranges the control data to be transmitted that has been subjected to LSB conversion by the physical value conversion unit 220 to thereby generate the packet data (common packet data) common for the communication protocols that is independent of the communication protocols such as multiple communication, serial communication, or DMA communication. A packet number PN is given to each common packet to indicate the packet type. In the figures following to FIG. 3 and in the following description, "PN1" or "PN2" indicates the packet number PN of "1" or "2" respectively.

When the data is transmitted from the first microcomputer 60 to the external, the communication data conversion 240 converts the common packet data generated by the common packet data unit 230 to a communication data string corresponding to the communication protocol of the communication target (communication receiver). In detail, the communication data conversion unit 240 performs various operations including, for example, dividing the common packet data into transfer units (maximum transfer unit) transmittable in one transmission, and adding the header information in conformity to the communication protocol to the data string of the maximum transfer unit.

Since the common packet data is converted to the communication data string corresponding to the communication protocol in steps as shown in FIG. 3 in the present embodiment, the communication data conversion unit 240 is further classified into two layers that is, an upper layer 240*u* and a lower layer 240*d*.

The communication driver unit 300, when the data is transmitted from the first microcomputer 60 to the external, sends out the communication data string generated by the communication data conversion unit 240 as the communication data actually at the transfer data quantity, baud rate, and transfer timing determined according to the communication protocol with the communication target. The communication driver unit 300 is provided with a DMA communication unit 310 for controlling the DMA communication with the second microcomputer 62, a serial communication unit 320 for controlling the serial communication with the attitude control ECU 8, and a multiple communication unit 330 for controlling the multiple communication with the air conditioner ECU 4 and the meter ECU 6.

The communication control unit 400 is provided with an internal timer and determines the timing for performing the communication data string generation and LSB conversion so that the communication with the microcomputer 62 and other ECUs 4, 6 and 8 is performed at the suitable timing.

On the other hand, the communication driver unit 300 (DMA communication unit 310, serial communication unit 320, and multiple communication unit 330) receives and acquires the data transmitted from the second microcomputer 62 and other ECUs 4, 6 and 8, and supplies the data to the communication data conversion unit 240.

The communication data conversion unit 240 also converts the communication data string acquired by the communication driver unit 300 to a common packet data. Furthermore, the common packet data unit 230 decomposes the common packet data generated by the communication data conversion unit 240 when the data is received from the external, extracts each of the control data that is a component of the common packet data, and controls the physical value conversion unit 220 to apply LSB conversion to each of the control data so that each of the control data subjected to LSB conversion is updated and written in the common memory.

On the other hand, the first table shown in FIG. 4 and the second table shown in FIG. 5 are stored in the table storage unit 500. A shown in FIG. 4, the first table is a definition table that correspondingly defines the Handle number of the control data, the common memory address for indicating which address is the head address stored in the common memory, the common memory size for indicating the data length in the common memory of the control data corresponding to the Handle number, the packet number of the common packet data in which the control data corresponding to the Handle number is summarized, the common packet data size for indicating the common packet data size for indicating the data length in the common packet data corresponding to the packet number, the common packet data position for indicating the location position in the common packet data corresponding to the packet number of the control data corresponding to the Handle number, and the LSB conversion call address for indicating which address is the head address of the program stored in the ROM for LSB conversion of the control data corresponding to the Handle number.

The common packet data position indicates which bytes is the head bytes of the control data corresponding to the Handle number in the common packet data in the case that the first 1 byte in the common packet data is 0th bytes.

As shown in FIG. 5, the second table is a definition table that correspondingly defines the packet number of the common packet data, the communication system for indicating what communication protocol should be used for communicating the 5 common packet data corresponding to the packet number, the common packet data message length for indicating the total data length of the common packet data corresponding to the packet number, the individual packet data message length for indicating the maximum transfer unit in the case that the common packet data corresponding to the packet number is communicated by means of the communication protocol of the communication system, and the header information to be added when the common packet data corresponding to the packet number is communicated by means of the communication protocol of the communication system.

"CAN", "SCI", and "DMA" described in the communication system columns in the second table shown in FIG. 5 denote multiple communication, serial communication, and DMA communication respectively.

Each object can acquire the information necessary to generate the communication data string, for example, the information concerning the control data of which the Handle number is summarized in the common packet data of PN1, by referring the tables in the table storage unit 500.

Next, the conversion process to the communication data string performed when the control data is transmitted from the first microcomputer 60 to the external is described with reference to FIG. 6 to FIG. 9.

Figure 6:
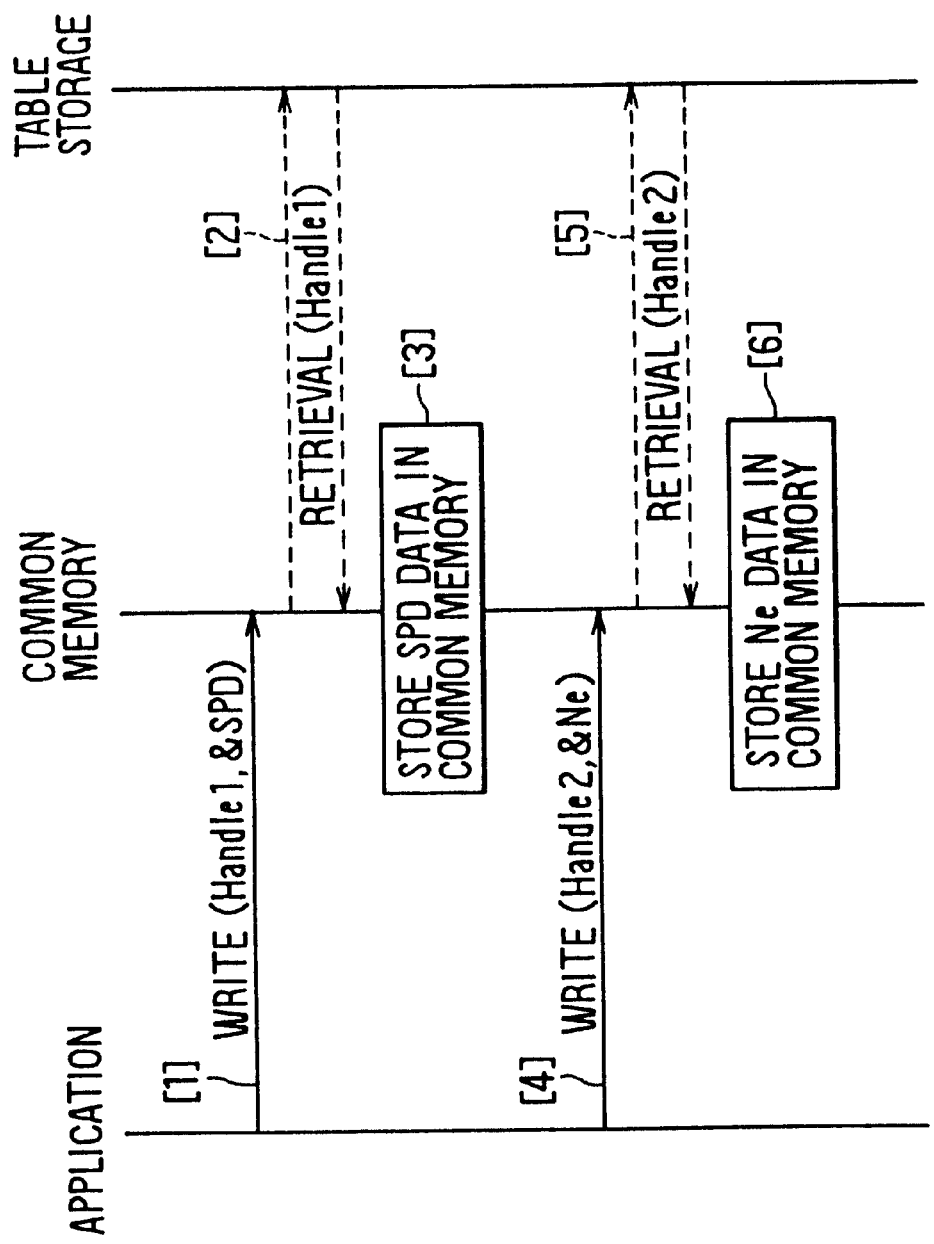
FIG. 6 is a message sequence chart illustrating a process operation for storing control data obtained by an application unit in a common memory.
Figure 7:
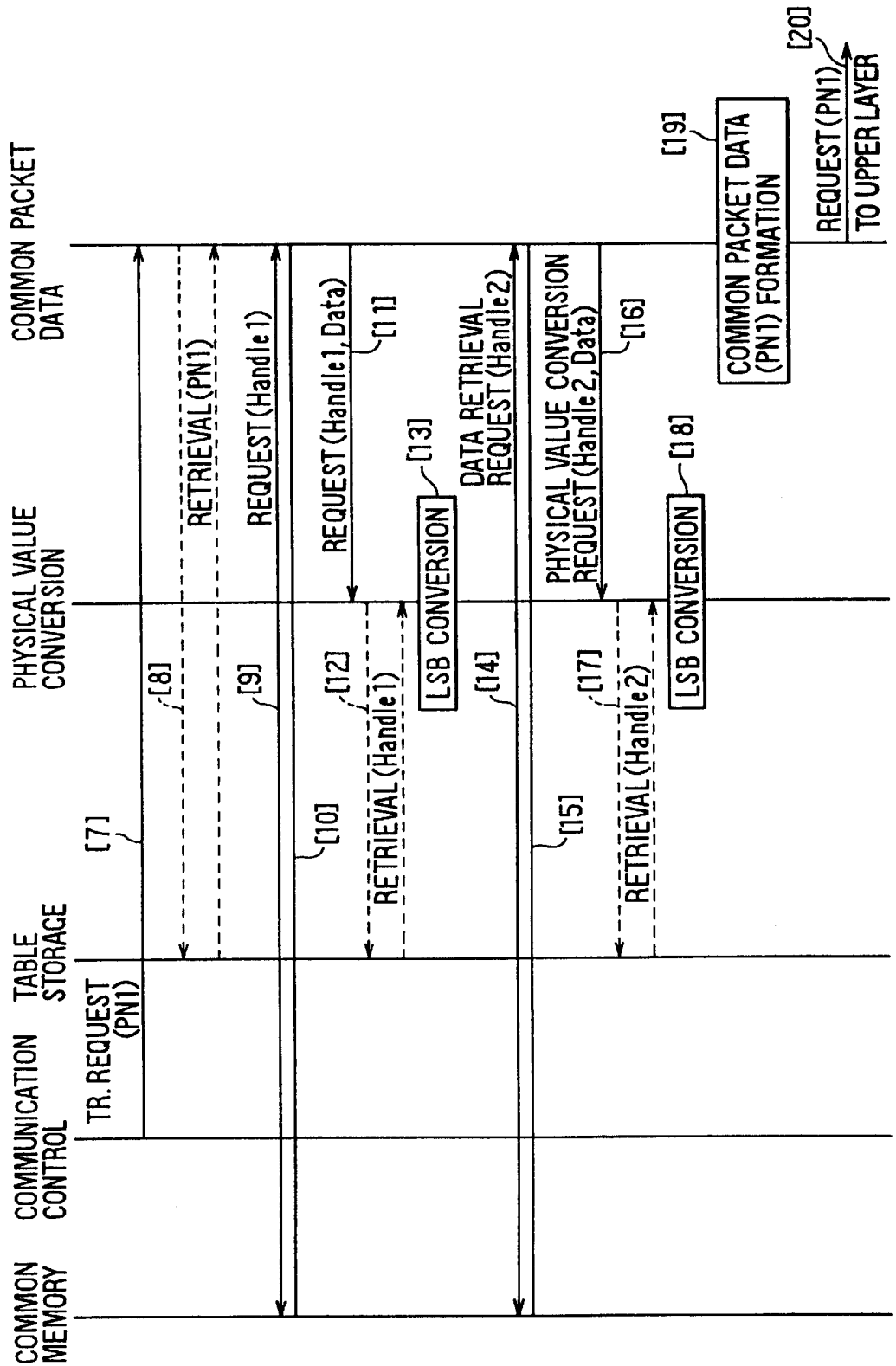
FIG. 7 is a message sequence chart illustrating a process operation for generating a common packet data from the control data stored in the common memory.
Figure 8:
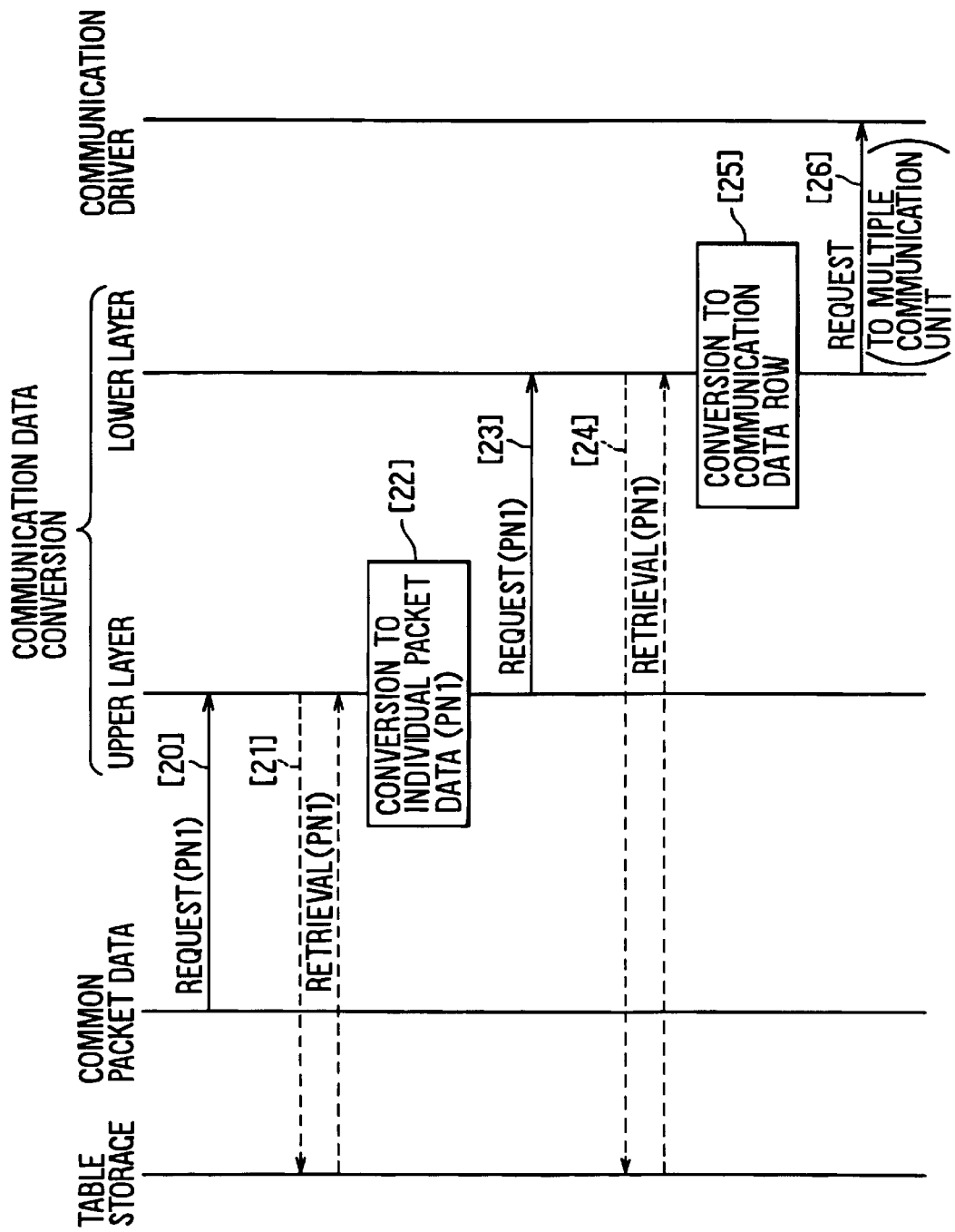
FIG. 8 is a message sequence chart illustrating a process operation for converting the common packet data generated by means of the process operation shown in FIG. 7 to a communication data string.

FIG. 6 to FIG. 8 are message sequence charts for describing the process sequence for converting the control data to the communication data string. In these message sequence charts, layers 100 to 500 shown in FIG. 3 are shown by vertical lines, and messages from the layers to other layers are shown by horizontal solid lines with arrows. Horizontal dashed lines with arrows indicate that layers refer to tables in the table storage unit 500, and in rectangular frames, the content of the process performed in the layer is shown.

Figure 9:
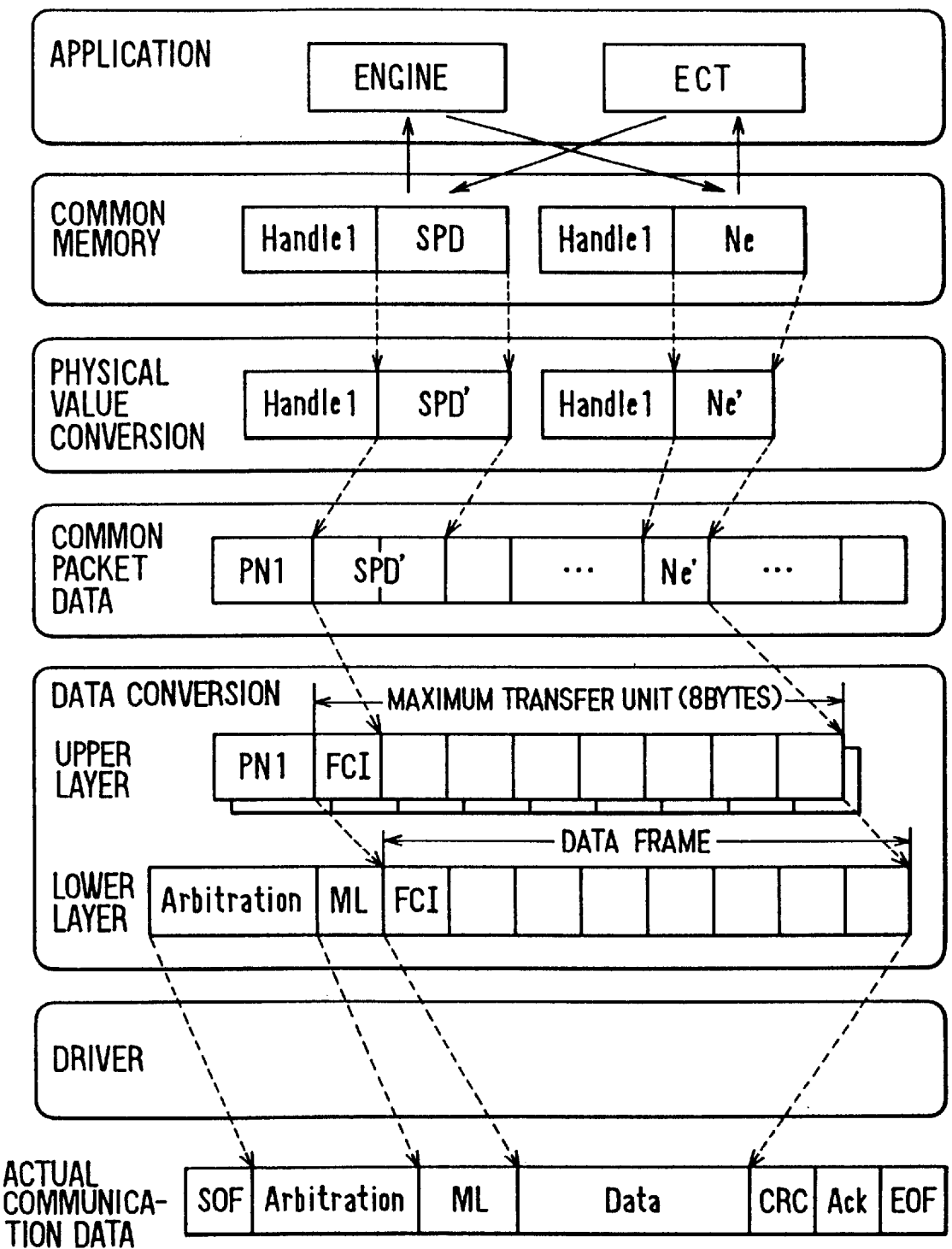
FIG. 9 is a schematic diagram illustrating conversion of external common data in the common memory to a communication data string to be actually transmitted for an example of a multiple communication.

FIG. 9 is a schematic diagram for showing an exemplary multiple communication in which the external common data (the control data used commonly by the second microcomputer 62 and other ECUs 4, 6 and 8) in the common memory is converted to the communication data string to be actually transmitted.

First, for example, in the ECT application software 120 in the application unit 100, at the time for starting the process step for writing the automobile speed SPD data (SPD data), which is one of the external common data, in the common memory, as shown in FIG. 6 by [1], the ECT application software 120 of the application unit 100 issues a data writing request message to the common memory unit 210. At that time, the Handle number of the SPD data (in this example, Handle 1) and the storage address of the SPD data in the ECT application software 120 (that is, the address of the control data memory area used when the ECT application software 120 writes or reads out the SPD data in arithmetic operation for control, and in this example, &SPD) are sent out to the common memory unit 210 together.

In the case that the process for issuing the data writing request message is programmed in C-language, the message issue command to store the SPD data in the common memory is shown hereinafter.

Write (Handle 1, &SPD)

The meaning of this command is that the data stored in &SPD (SPD data obtained by the ECT application software 120) is written in the address of the common memory corresponding to the Handle number (Handle 1) of the SPD data. In the case that an application software 110, 120, or 130 of the application unit 100 writes the control data other than the SPD data in the common memory, "Handle 1" among the command is replaced by the Handle number to be written, and "&SPD" is replaced by the address of the memory area where the data to be written is stored among the control data memory area provided for the application software.

When the common memory unit 210 receives the message from the application unit 100 (ECT application software 120), as shown in FIG. 6 by [2], the common memory unit 210 refers the first table (FIG. 4) in the table storage unit 500 to thereby acquire the common memory address and common memory size corresponding to the Handle number (Handle 1) transmitted together with the message.

At that time, the common memory unit 210 recognizes that the SPD data is to be written in the two bytes area having the head address of $FFFF0000 in the common memory based on the common memory information acquired as described above, and in the process shown in FIG. 6 by [3], copies the two bytes PD data from the storage address (&SPD) of the SPD data in the ECT application software 120 to the address of $FFFF0000 of the common memory.

The SPD data corresponding to Handle 1 is stored in the common memory as shown on the left side of the second row in FIG. 9 by means of the process of the common memory unit 210.

Next, for example, the process step for writing the rotation speed Ne data (Ne data), which is one of the external common data, in the common memory by use of the engine application software 110 in the application unit 100 is described. As shown in FIG. 6 by [4], the engine application software 110 of the application unit 100 issues the data writing request message to the common memory unit 210 in the same manner as in the case of the SPD data. At that time, the Handle number of the Ne data (in this example, Handle 2) and the storage address of the Ne data in the engine application software 110 (that is, the address in the control data memory area used when the engine application software 110 stores and read out the Ne data in arithmetic operation for control, and in this example, &Ne) are sent to the common memory unit 210 together.

Upon receiving the message from the application unit 100 (engine application software 110), the common memory unit 210 refers to the first table (FIG. 4) in the table storage unit 500 to thereby acquire the common memory address and common memory size corresponding to the Handle number (Handle 2) sent together with the message as the common memory information.

At that time, the common memory unit 210 recognizes that the Ne data is to be written in the two type area having the head address of $FFFF0002 in the common memory based on the common memory information acquired as described above, and in the process shown in FIG. 6 by [6], copies the two bytes Ne data from the storage address (&Ne) of the Ne data in the engine application software 110 to the address of $FFFF0002 of the common memory.

The Ne data corresponding to Handle 2 is stored in the common memory as shown on the right side of the second row in FIG. 9 by means of the process of the common memory unit 210.

Though not shown in the figure, other control data calculated by the engine application software 110 and ECT application software 120 and the control data calculated by the cruise application software 130 are copied in the same manner as described above.

At the timing when the data is transmitted to the second microcomputer 62 and other ECUs 4, 6 and 8, as shown in FIG. 7 by [7], the communication control unit 400 issues the transmission request message to the common packet data unit 230 so as to generate the common packet data as exemplarily shown on the 4th row in FIG. 9.

Though only one packet number PN is shown in FIG. 9, actually there are many packet numbers, the communication control unit 400 sends the packet number PN of the common packet data that is the packet data to be transmitted this time (in this example, PN1) together with the transmission request message to the common packet data unit 230. The description in ( ) in FIG. 7 and FIG. 8 indicates that the packet number PN sent from the communication control unit 400 to the common packet data unit 230 was PN1.

Then, the common packet data unit 230 refers the first table (FIG. 4) in the table storage unit 500 as shown in FIG. 7 by [8], and acquires Handle numbers corresponding to the packet number PN sent from the communication control unit 400 (that is, Handle numbers of the control data to be summarized on the common packet data of the packet number PN sent from the communication control unit 400) and the common packet data size and common packet data position corresponding to respective Handle numbers as the common packet information.

Furthermore, the common packet data unit 230 acquires the control data corresponding to the respective above-mentioned acquired Handle numbers from the common memory, and performs the operation for controlling the physical value conversion unit 220 to perform LSB conversion of the control data.

For example, when the packet number PN, which is sent from the communication control unit 400 to the common packet data unit 230, is PN1, the common packet data unit 230 obtains, from the first table in FIG. 4, the Handle numbers such as Handle 1, Handle 2, Handle 3 . . . , and the common packet data size and common packet data position corresponding to the Handle numbers, respectively.

In the case of this example, the common packet data unit 230 first sends one of the acquired Handle numbers (herein, Handle 1) to the common memory unit 210 together with the data acquisition request message as shown in FIG. 7 by [9].

Then, the common memory unit 210 refers the first table (FIG. 4) in the table storage unit 500 to acquire the common memory address ($FFFF0000) and the common memory size (2bytes) corresponding to the Handle number (Handle 1) sent together with the data acquisition request message in the same manner as shown FIG. 6 by [2] and FIG. 6 by [5]. Furthermore, the common memory unit 210 reads out the 2 bytes data (in this example, SPD data) from $FFFF0000 address of the common memory based on the acquired common memory information, and returns the read out data to the common packet data unit 230 as a return value as shown in FIG. 7 by [10].

Then, the common packet data unit 230 issues the data (Data) returned from the common memory 210 and the physical value conversion request message including the Handle number (Handle 1) corresponding to the data to the physical value conversion unit 220 as shown in FIG. 7 by [11].

The physical value conversion unit 220 refers the first table (FIG. 4) in the table storage unit 500 to acquire the LSB conversion call address corresponding to the Handle number (Handle 1) transmitted together with the physical value conversion request message. Then, the physical value conversion unit 220 activates the program stored in the acquired LSB conversion call address to thereby perform LSB conversion on the data (Data) sent together with the physical value conversion request message.

As a result, as shown on the left side in the third row in FIG. 9, the SPD data corresponding to Handle 1 is LSB-converted by the physical value conversion unit 220 (that is, the data length is converted), and the LSB-converted data (SPD' data) is stored together with the corresponding Handle number (Handle 1) in the predetermined area of the RAM assigned as the working area of the physical value conversion unit 220.

Thereafter, the common packet data unit 230 sends the next Handle number (herein, Handle 2) out of Handle numbers acquired in the operation in [8] together with the data acquisition request message to the common memory unit 210 as shown in FIG. 7 by [14].

Then, the common memory unit 210 refers to the first table (FIG. 4) in the table storage unit 500 to acquire the common memory address ($FFFF0002) and the common memory size (2 bytes) corresponding to Handle 2 as the common memory information, furthermore reads out the 2 bytes data (in this example, Ne data) from the address $FFFF0002 of the common memory based on the acquired common memory information, and returns the read out data to the common packet data unit 230 as the return value as shown in FIG. 7 by [15].

Then, the common packet data unit 230 issues the data (Data) returned from the common memory 210 and the physical value conversion request message including the Handle number (Handle 2) corresponding to the data to the physical value conversion unit 220 in the same manner as in the case [11] described above as shown in FIG. 7 by [16].

The physical value conversion unit 220 refers the first table (FIG. 4) in the table storage unit 500 to acquire the LSB conversion call address corresponding to the Handle number (Handle 2) sent together with the physical value conversion request message and performs LSB conversion on the data (Date) sent together with the physical value conversion request message in the same manner as in the case of [12] and [13] as shown in FIG. 7 by [17] and FIG. 7 by [18].

As a result, as shown on the right side in the third row in FIG. 9, the Ne data corresponding to Handle 2 is LSB-converted by the physical value conversion unit 220, and the LSB-converted data (Ne' data) is stored together with the corresponding Handle number (Handle 2) in the predetermined area of the RAM assigned as the working area of the physical value conversion unit 220.

Though not shown in the figure, the same process operation as performed in [9] to [13] and [14] to [18] in FIG. 7 is performed on other Handle numbers corresponding to respective packet numbers PN sent from the communication control unit 400 to the common packet data unit 230 and the control data of the respective Handle numbers is LSB-converted by the physical value conversion unit 220.

The reason why the control data is LSB-converted is described. As shown in the first row and the second row in FIG. 9, the application software in the first microcomputer 60 such as the engine application software 110 or the ECT application software 120 handles the Ne data in the form of 2 bytes data length to operate the control magnitude.

On the other hand, in the components other than the first microcomputer 60 (for example, the second microcomputer 62 and the meter ECU 6), the Ne data is handled as the data of 1 byte data length, in some cases, the data length to be handled is different between the first microcomputer 60 and other communication receivers. That is, the data length=data accuracy as described above, what control data is handled in the form of what data length by what microcomputer or by what ECU (electronic control unit) is determined when the automobile control system is designed.

In the present embodiment, the common packet data size and the storage address of the LSB conversion program to the data size (LSB conversion call address) are defined by the first table, and the data length of the control data to be transmitted to the external is converted to the data length that corresponds to the data accuracy employed by the communication receiver by referring to the first table.

In the present embodiment, since such LSB conversion operation is performed in the physical value conversion unit 220 separately from the application unit 100, it is not necessary for the application software itself to control the control target to recognize the data accuracy employed by the communication receiver. For example, even though the data length of the Ne data to be handled by a communication receiver is changed from 1 byte to 2 bytes, it is sufficient to change the change that the common packet data size in the first table and the LSB conversion call address. Thus, only very simple modification work is required.

Reference is made to FIG. 7 again. When all the control data of the Handle numbers corresponding to the packet numbers PN sent from the communication control unit 400 to the common packet data unit 230 are LSB-converted by the physical value conversion unit 220 according the procedure described above, the common packet data unit 230 arranges in series the LSB-converted control data temporarily stored together with the Handle number in the working area of the physical value conversion unit 220 based on the common packet data position and the common packet data size corresponding to the Handle number acquired from the first table in the operation of [8] in the process shown in FIG. 7 by [19].

The reason for this is that the control data of what Handle number is located at what position of the common packet data with what data length is determined based on the common packet data position and the common packet data size corresponding to the Handle number in the first table.

The common packet data that has been collected and arranged in series is stored in the predetermined area of the RAM assigned as the working area of the common packet data unit 230 together with the corresponding packet number (PN1) by the process performed by the common packet data unit 230 as shown in the fourth row in FIG. 9.

For example, as shown in FIG. 4, since the common packet data position and the common packet data size corresponding to Handle 1 corresponding to PN1 are "0" and "2 bytes" respectively, and the common packet data position and the common packet data size corresponding to Handle 2 corresponding to PN1 are "6" and "1 byte" respectively, as shown in fourth row in FIG. 9, the data of Handle 1 (SPD' data) is located in the 2 bytes area having the head at 0th byte of the common packet data, and the data of Handle 2 (Ne' data) is located in the 1 byte area having the head at 6th byte of the common packet data.

After completion of the common packet data generation, the common packet data unit 230 issues the transmission request message to convert the generated common packet data to the communication data string corresponding to the communication protocol with the communication target to the upper layer 240u of the communication data conversion unit 240 as shown in FIG. 7 by [20] and FIG. 8 by [20]. The packet number (in this example, PN1) of the common packet data generated at this time is also sent to the upper layer 240u of the communication data conversion unit 240.

Then, the upper layer 240u refers to the second table (FIG. 5) in the table storage unit 500 to thereby acquire the common packet message length and the individual packet data message length corresponding to the packet number PN sent from the common packet data unit 230 as the individual packet information as shown in FIG. 8 by [21].

Next, in the process [22] in FIG. 8, the upper layer 240u converts the common packet data temporarily stored in the working area of the common packet data unit 230 to the individual packet data based on the common packet data message length and the individual packet data message length acquired from the second table in the process [21].

For example, in the case that the packet number PN is PN1, the common packet data message length corresponding to PN1 (the total data length of the common packet data) is "12 bytes" and the individual packet data message length (the maximum transfer unit that is transmissible in one transmission) is "8 bytes" as shown in FIG. 5. Therefore, the upper layer 240u divides the 12 bytes common packet data generated by the common packet data unit 230 into two data strings that is a 7 bytes data string and a 5 bytes data string and adds the 1 byte FCI (Fragment Control Information) to the head of each divided data string to thereby generate two individual packet data as shown in 5th row in FIG. 9. The upper layer 240u stores the generated respective packet data in the predetermined area of the RAM assigned as the working area of the upper layer 240u together with the corresponding packet number (in this example, PN1).

However, in the case that the common packet data message length acquired from the second table is equal to or smaller than the individual packet data message length, the upper layer 240u stores the common packet data generated by the common packet data unit 230 as it is in the working area of the upper layer 240u as the individual packet data. In this case, it is not necessary to divide the common packet data and to add the FCI.

Furthermore, for example, in the case that the maximum transfer unit is changed to the communication protocol of other than 8 bytes, the change can be accommodated only by changing the value stored in the item of the individual packet data message length in the second table.

Then, the upper layer 240u issues the transmission request message to the lower layer 240d so as to convert the individual packet data generated as described above to the communication data string corresponding to the communication protocol acceptable by the communication receiver after completion of the individual packet data generation as shown by [23] in FIG. 8. At that time, the packet number of the common packet data that is the original of the individual packet data generated this time is also sent to the lower layer 240d.

Then, the lower layer 240d refers to the second table (FIG. 5) in the table storage unit 500 to thereby acquire the communication system and the header information corresponding to the packet number PN sent from the upper layer 240u as the communication data information as shown by [24] in FIG. 8.

In the process of [25] shown in FIG. 8, the lower layer 240d converts the respective individual packet data temporarily stored in the working area of the upper layer 240u to the communication data string corresponding to the communication protocol that the communication system indicates based on the communication system and the header information acquired from the second table in the operation shown by [24] described above.

For example, in the case that the packet number PN is PN1, the communication system corresponding to PN1 is "CAN" that indicates the multiple communication, and the header information is "arbitration=0x123" and "ML=08" as shown in FIG. 5. Where, Arbitration indicates the priority of the data and an arbitration data used for arbitrating data collision. "Arbitration=0x123" indicates that Arbitration is 123 of hexadecimal numeral. ML is the data for indicating the data length of the data frame part in the communication data string, and "ML=08" indicates that the data length of the data is 8 bytes.

Therefore in the case of this example, the lower layer 240d adds the Arbitration and ML as the header information acquired in the operation described in [24] to the head of the respective individual packet data generated by the upper layer 240u to thereby generate communication data strings corresponding to CAN, and stores the respective generated communication data strings in the predetermined area of the RAM assigned as the working area of the lower layer 240d as shown in 6th row in FIG. 9 (the position which is described as the lower layer).

For example, in the case that the communication system acquired from the second table is "SCI" that indicates the serial communication, the lower layer 240d adds the header information to the head of the individual packet data generated by the upper layer 240u and also adds the check of some data to the tail of the individual packet data.

After the completion of the communication data string, the lower layer 240d issues the transmission request message to the object corresponding to the communication system acquired in the process [24] among the DMA communication unit 310, serial communication unit 320, and multiple communication unit 330 in the communication driver unit 300 as shown by [26] in FIG. 8.

Then, the object in the communication driver unit 300 (any one of the DMA communication unit 310, serial communication unit 320, and multiple communication unit 330), which is the destination of the message issued by the lower layer 240d, sends out the communication data string stored in the working area of the lower layer 240d to the external as the actual communication data at the baud rate and transfer timing corresponding to the communication protocol of the lower layer 240d itself.

For example, the lower layer 240d issues the transmission request message to the multiple communication unit 330 of the communication driver unit 300 in the case that the communication system acquired from the second table in the operation described in [24] is CAN.

Then, the multiple communication unit 330 sends out the communication data string generated by the lower layer 240d to the communication IC 70 and also controls the communication IC 70 to send out the actual communication data to the multiple communication line 10. As shown in 8th row in FIG. 9 (bottom row), at that time, the communication IC 70 adds the SOF data that indicates the starting of 1 frame of the communication data to the head of the communication data string generated by the lower layer 240d and further successively adds the CRC data for checking an error, Ack data for receiving the reception response from the communication receiver, and EOF data for indicating the end of 1 frame of the communication data to the tail of the communication data string, and sends out the data string to which respective data are added to the multiple communication line 10 as the actual communication data. Through the series of processes, the control data obtained by the application unit 100 in the first microcomputer 60 is converted into the data string of the communication protocol corresponding to the multiple communication line 10 and transmitted to the air conditioner ECU 4 and the meter ECU 6.

Figure 10:
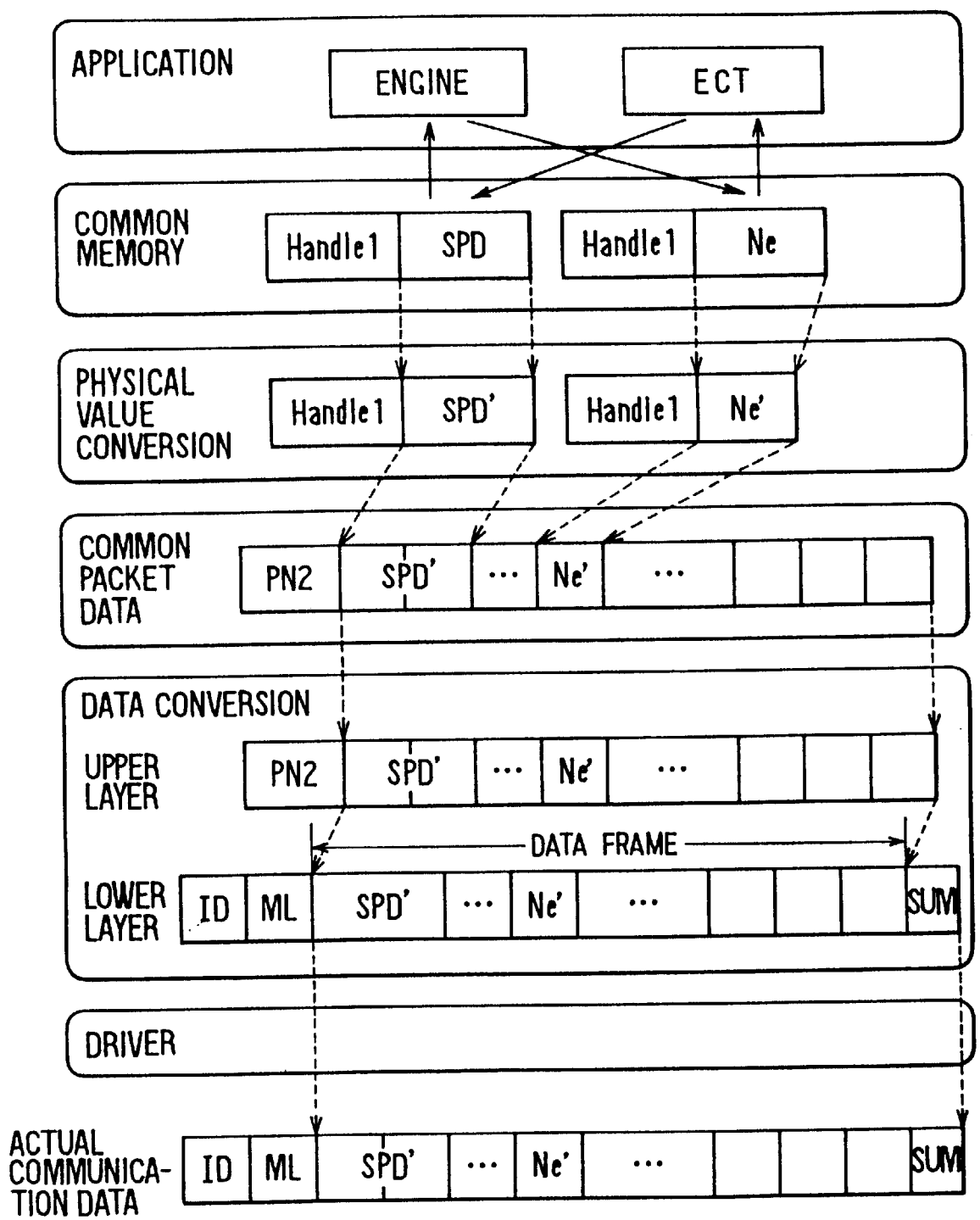
FIG. 10 is a schematic diagram illustrating conversion of external common data in the common memory to a communication data string to be actually transmitted for an example of a serial communication.

An exemplary case in which the SPD data and Ne data obtained by the application unit 100 are transmitted by means of the multiple communication (CAN) communication protocol is described mainly above, in the next place, the case in which the SPD data and Ne data obtained by the application unit 100 are transmitted to the attitude control ECU 8 by means of the serial communication is described in detail with reference to FIG. 10. FIG. 10 is a schematic diagram for illustrating conversion of the external common data in the common memory to the communication data string to be transmitted actually exemplarily by means of the serial communication.

In FIG. 10, the SPD data and Ne data stored in the common memory by the common memory unit 210 is common for the case shown in FIG. 9 described above. The SPD data and Ne data in the common memory are subjected to LSB conversion based on the first table shown in FIG. 4 in the same manner as described above with reference to [7] to [19] in FIG. 7 and FIG. 9, and the common packet data is generated from the LSB-converted SPD' data and Ne' data.

In detail, in the case that the data is transmitted to the attitude control ECU 8, the communication control unit 400 sends the transmission request message to the common packet data unit 230 together with PN2 in [7] in FIG. 7. The SPD data of Handle 1 and the Ne data of Handle 2 corresponding to PN2 in the first table in FIG. 4 are LSB-converted according to the same procedure as used in [8] to [18] in FIG. 7 (3rd row in FIG. 10).

In this case, in the first table in FIG. 4, the common packet data position and the common packet data size corresponding to Handle 1 corresponding to PN2 are "0" and "2 bytes" respectively, and the common packet data position and the common packet data size corresponding to Handle 2 corresponding to PN2 are "4" and "1 byte" respectively. Therefore, in the process [19] in FIG. 7, as shown in 4th row in FIG. 10, the LSB-converted SPD' data corresponding to Handle 1 is located in the 2 bytes area from the position of 0th bytes of the common packet data and the LSB-converted Ne' data corresponding to Handle 2 is located in the 2 bytes area from the position of 4th bytes of the common packet data, and the common packet data is generated as described above.

Next, the communication data conversion unit 240 converts the data to the communication data string corresponding to the serial communication based on the second table in FIG. 5 in the same manner as used in [21] to [25] in FIG. 8 and in FIG. 9 described above.

However, in the case of the serial communication, since the common packet data message length (12 bytes) corresponding to PN2 is shorter than the individual packet message length (14 bytes) corresponding to the same PN2 in the second table shown in FIG. 5, as shown in 5th row in FIG. 10, the upper layer 240u of the communication data conversion unit 240 stores the common packet data generated by the common packet data unit 230 as it is in the working area of the upper layer 240u itself as the individual packet data in the process [22] shown in FIG. 8.

Since the communication system corresponding to PN2 is "SCI" that indicates the serial communication and the header information is "ID=1" and "ML=16" in the second table shown in FIG. 5, as shown in 6th row in FIG. 10 (the position that is described as lower layer), the lower layer 240d of the communication data conversion unit 240 adds the ID and ML as the header information to the head of the individual packet data stored in the working area of the upper layer 240u and also adds the check sum data SUM to the tail of the individual packet data to thereby generate the communication data string according to the serial communication (SCI). The ID is an identifier code of the first microcomputer 60 that is the sender of the serial data.

Thereafter, since the communication system corresponding to PN2 is SCI in the second table shown in FIG. 5, the lower layer 240d of the communication data conversion unit 240 issues the transmission request message to the serial communication unit 320 of the communication driver 300 in the process [26] in FIG. 8.

Then, the serial communication unit 320 successively sends out the communication data string generated by the lower layer 240d to the serial communication line 11 at the baud rate and transfer timing corresponding to the communication protocol of the serial communication.

Through the series of processes as described above, the control data obtained by the application unit 100 in the first microcomputer 60 is converted to the communication data string according to the communication protocol corresponding to the serial communication line 11 and transmitted to the attitude control ECU 8.

As described above, in comparison between the case of the multiple communication (FIG. 9) and the case of the serial communication (FIG. 10), the process itself performed by respective units 210 to 240 of the communication conversion unit 200 is not different, only the location position of the external common data such as the header information, SPD data, and Ne data in the communication data string is different, and all the different components are defined by the first table (FIG. 4) and the second table (FIG. 5). Therefore, by only changing the content defined by the first table and the second table, the difference in the location position of the communication protocol and external common data in the communication data string can be accommodated.

The conversion process of the communication data string performed when the control data is transmitted from the first microcomputer 60 to the external is described above, on the other hand when the first microcomputer 60 receives the control data from the external, the respective units 210 to 240 of the communication conversion unit 200 perform the process that is performed in reverse order to the process.

Figure 11:
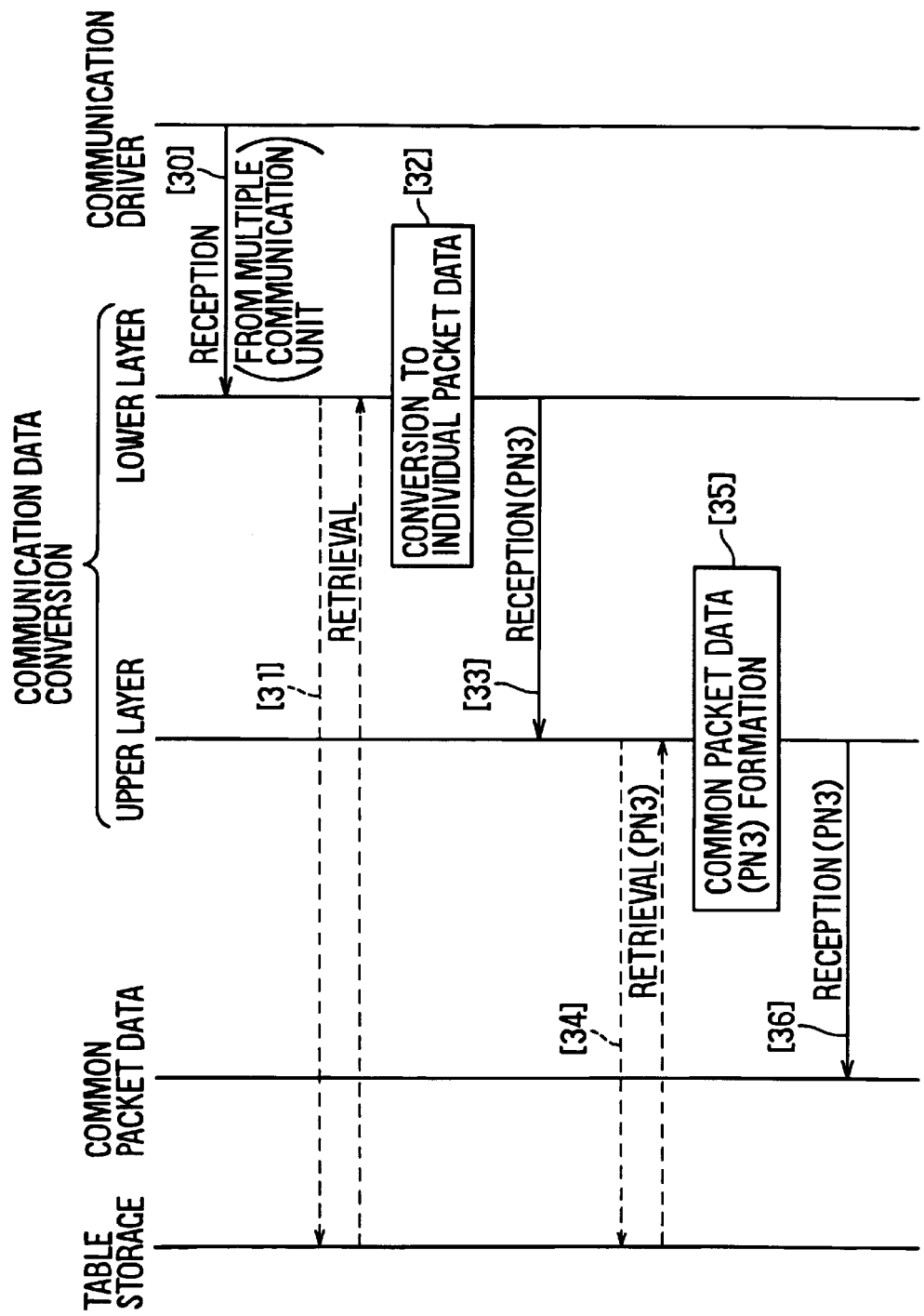
FIG. 11 is a message sequence chart illustrating a process operation for generating common packet data from reception data.
Figure 12:
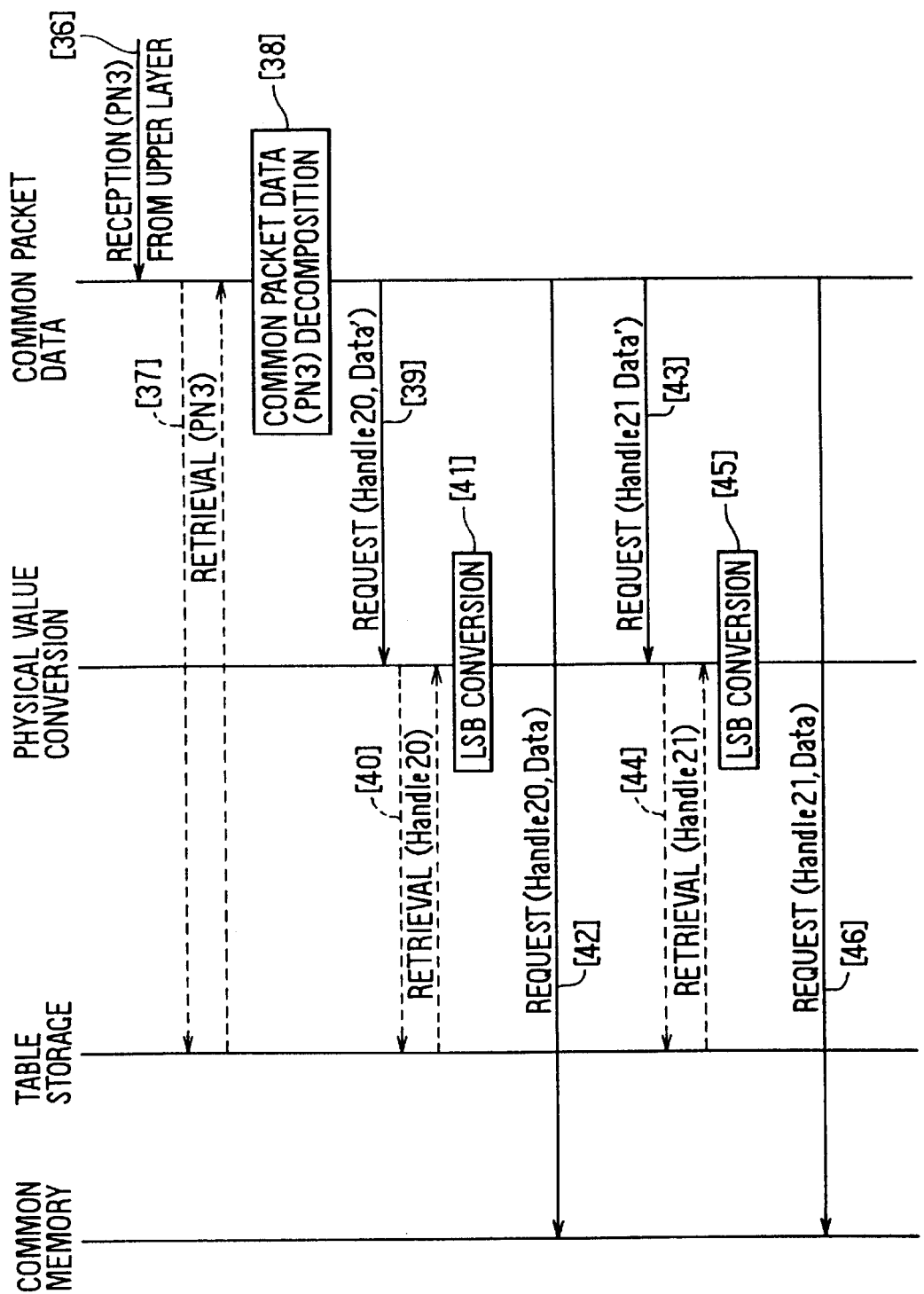
FIG. 12 is a message sequence chart illustrating a process operation for extracting a control data from the common packet data generated by means of the process operation shown in FIG. 11 and for storing the control data in the common memory.
Figure 13:
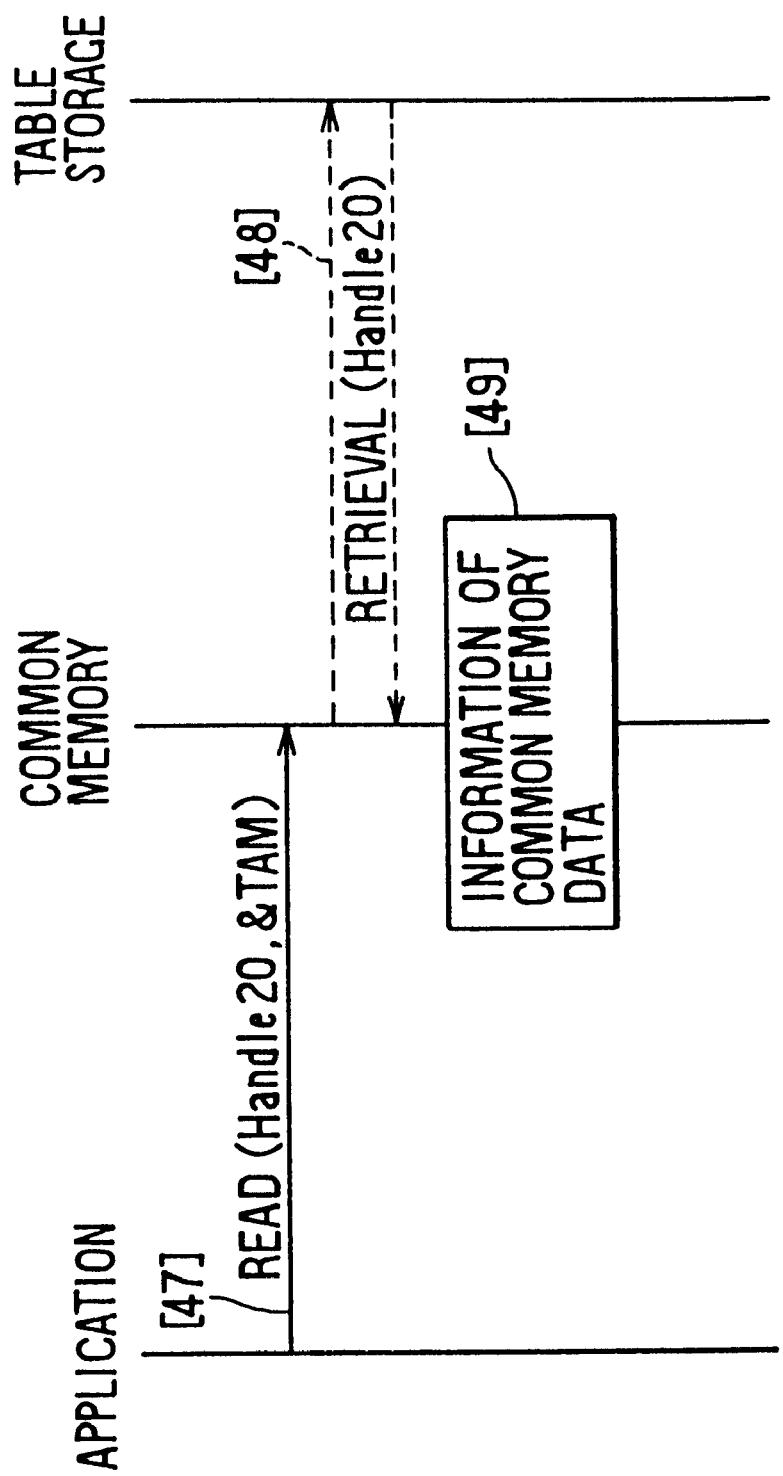
FIG. 13 is a message sequence chart illustrating a process operation in which the application unit uses the control data in the common memory for control operation.
Figure 14:
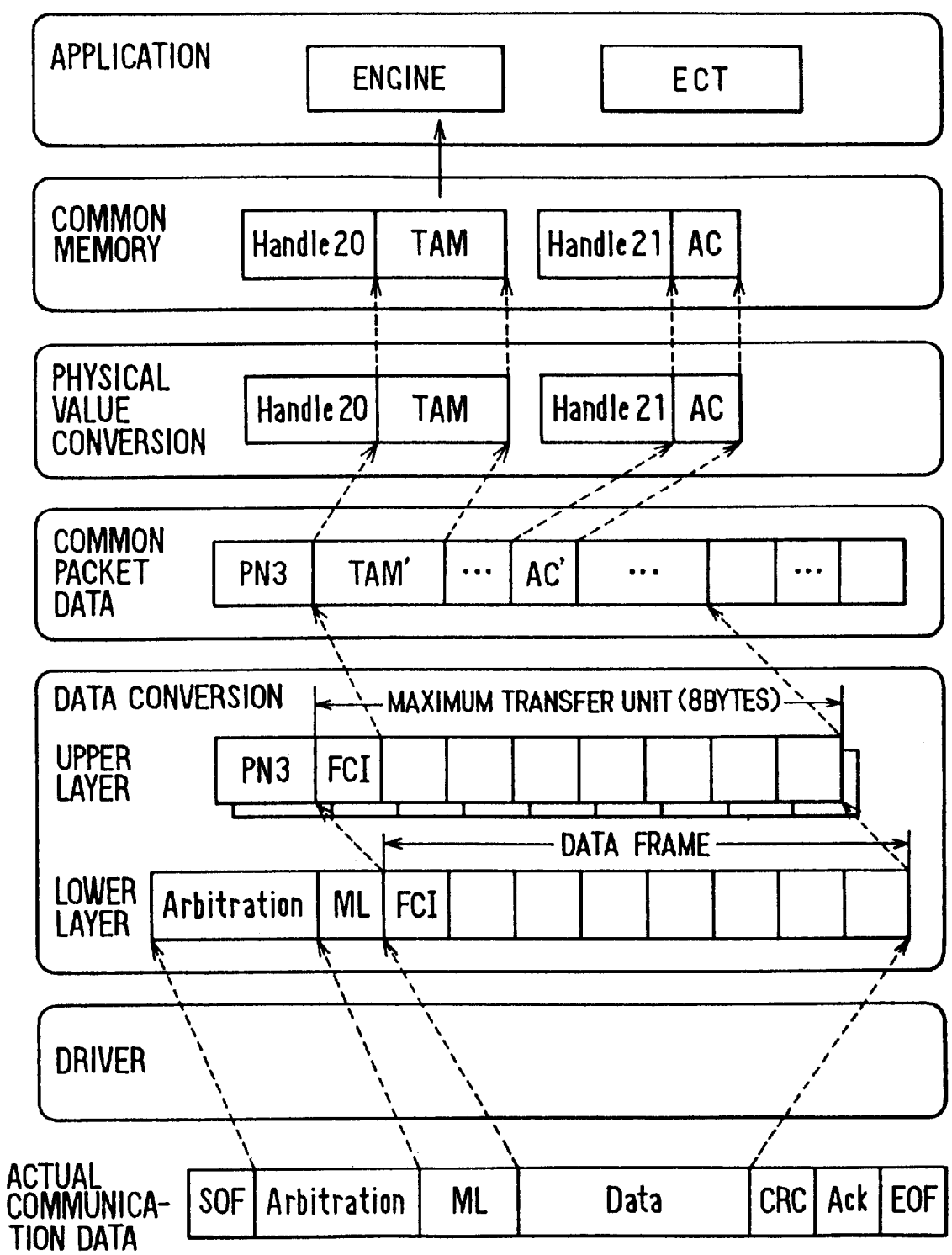
FIG. 14 is a schematic diagram illustrating a conversion of a communication data string supplied from the external to the control data used for control operation in the application unit in the first microcomputer for an exemplary case of the multiple communication.

Next, the process performed when the first microcomputer 60 receives the control data from the external is described with reference to FIG. 11 to FIG. 14 for an example of the multiple communication. FIG. 11 to FIG. 13 are message sequence charts for describing the conversion process operation from the received communication data string to the control data, and the meaning of vertical or horizontal lines and horizontal arrows is the same as those described with reference to FIG. 6 to FIG. 8. FIG. 14 is a schematic diagram for describing the conversion of the communication data to the control data used for control operation in the application unit 100 of the first microcomputer 60 as an example of the multiple communication.

First, when the communication data is transmitted from the air conditioner ECU 4 or the meter ECU 6 through the multiple communication line 10, the multiple communication unit 330 of the communication driver unit 300 acquires the reception data from the communication IC 70 (that is, communication data received by the communication IC 70) in 1 frame unit, and issues the reception information message to the lower layer 240d of the communication data conversion unit 240 as shown by [30] in FIG. 11.

The communication IC 70 deletes SOF, CRC, Ack, and EOF data from each frame of the communication data transmitted through the multiple communication line 10 as shown in 8th row (bottom row) shown in FIG. 14, and sends out the communication data string composed of the header information (Arbitration and ML) and the data frame part (Data) to the first microcomputer 60 as the reception data for 1 frame. In the following description, it is assumed that the communication data composed of Arbitration (0×124) and ML (08) is transmitted through the multiple communication line 10.

After the communication driver unit 300 issues the reception information message, the lower layer 240 of the communication data conversion unit 240 refers to the second table (FIG. 5) in the table storage unit 500 to thereby acquire the communication system and the packet number corresponding to the header information of the reception data acquired by the communication driver unit 300 (in the present example, the multiple communication unit 330) as the communication data information as shown by [31] shown in FIG. 11.

Next, in the process [32] shown in FIG. 11, the lower layer 240d converts each 1 frame reception data acquired by the communication driver unit 300 to the individual packet data based on the communication system acquired from the second table in the process [31].

For example, in the case that Arbitration and ML acquired by the communication driver unit 300 are × 124 and 08 respectively, CAN is acquired as the communication system and PN3 is acquired as the packet number from the second table shown in FIG. 5 in the process [31]. In this case, the lower layer 240d deletes the information other than the data frame part (in the present example, the header information) from each 1 frame reception data acquired by the communication driver unit 300 and generates the individual packet data as shown in 6th row (the position where the lower layer is described) and 5th row (the position where the upper layer is described) shown in FIG. 14.

If the communication system acquired from the second table is SCI, the lower layer 240d deletes the header information and the check some data SUM from the 1 frame reception data acquired by the communication driver unit 300 and generates the individual packet data (6th row shown in FIG. 10 (the position where the lower layer is described) and 5th row (the position where the upper layer is described)).

Afterwards, the lower layer 240d issues the reception information message to the upper layer 240u as shown by [33] shown in FIG. 11. At that time, the packet number (in the present example, PN3) acquired from the second table in the process [31] is sent to the upper layer 240u.

Then, the upper layer 240u refers to the second table (FIG. 5) in the table storage unit 500 and acquires the common packet data message length and the individual packet data message length corresponding to PN3 sent from the lower layer 240d as the individual packet information as shown by [34] in FIG. 11.

In the process [35] shown in FIG. 11, the upper layer 240u generates the common packet data of PN3 from the individual packet data generated by the lower layer 240d based on the individual packet information acquired in [34].

In detail, as shown in FIG. 5, since the common packet data message length corresponding to PN3 is "12 bytes" and the individual packet data message length is "8 bytes" as shown in FIG. 5, the upper layer 240u deletes FCI from each individual packet data generated by the lower layer 240d, and combines the individual packet data from which FCI has been deleted in the order that is indicated by FCI that has been included to thereby generate the common packet data.

After the upper layer 240u completes generation of the common packet data, the upper layer 240u issues the reception information message to the common packet data unit 230 as shown by [36] in FIG. 11 and [36] in FIG. 12. At that time, the packet number (that is, the packet number of the common packet data generated this time) is also sent to the common packet data unit 230.

In the case that the common packet data message length acquired from the second table in the process [34] is equal to or shorter than the individual packet data message length (for example, in the case of the serial communication), the upper layer 240u sends out the individual packet data generated by the lower layer 240d as it is as the common packet data and issues the reception information message to the common packet data unit 230. That is, in this case, only one individual packet data is generated by the lower layer 240d, and the individual packet data is used as the common packet data as it is (5th row shown in FIG. 10 (the position where the upper layer is described) and 4th row).

Next, after the upper layer 240u issues the reception information message to the common packet data unit 230, the common packet data unit 230 refers the first table (FIG. 4) in the table storage unit 500 to thereby acquire each Handle number corresponding to the packet number sent from the upper layer 240u (that is, each Handle number of the control data summarized in the common packet data generated by the upper layer 240u) and the common packet data size and the common packet data position corresponding to each Handle number as the common packet information as shown by [37] in FIG. 12.

In the process [38] shown in FIG. 12, the common packet data unit 230 decomposes the common packet data generated by the upper layer 240u into individual control data based on the common packet data position and the common packet data size corresponding to each Handle number acquired from the first table in the process [37].

That is, the information that the control data of what Handle number having what data length is located in what position of the common packet data is found based on the common packet data position and the common packet data size corresponding to each Handle number in the first table.

For example, in the case that PN3 is sent from the upper layer 240u to the common packet data unit 230 as the packet number, the common packet data position and the common packet data size corresponding to Handle 20 corresponding to PN3 are "0" and "2 bytes" respectively, and the common packet data position and the common packet data size corresponding to Handle 21 corresponding to PN3 are "4" and "1 byte" respectively as shown in FIG. 4. Therefore in this case, as shown in 4th row and 3rd row in FIG. 14, the data located in 2 bytes area having the head at the 0th bytes of the common packet data is stored in the working area of the common packet data unit 230 as the control data before LSB conversion corresponding to Handle 20 (in the present embodiment, the outside temperature TAM data before LSB conversion, and TAM' data), and the data located in 1 byte area having the head at 4th bytes of the common packet data is stored in the working area of the common packet data unit 230 as the control data before LSB conversion corresponding to Handle 21 (in the present embodiment, the air conditioner control data AC before LSB conversion, and AC' data).

The common packet data unit 230 finishes decomposition of the common packet data, and then controls the physical value conversion unit 220 to apply LSB conversion to the each control data obtained by decomposition and controls the common memory unit 210 to store the LSB-converted control data in the common memory.

In detail, in the present example, the common packet data unit 230 first issues the physical value conversion request message including one (Data') among control data obtained by decomposition of the common packet data and the Handle number (herein Handle 20) corresponding to the control data to the physical value conversion unit 220 as shown by [39] in FIG. 12.

Then, the physical value conversion unit 220 refers to the first table (FIG. 4) in the table storage unit 500 and acquires the LSB conversion call address corresponding to the Handle number (Handle 20) transmitted together with the physical value conversion request message as shown by [40] in FIG. 12. The physical value conversion unit 220 then activates the program stored in the LSB conversion call address acquired as described above to thereby apply LSB conversion to the data (Data') of Handle 20 transmitted together with the physical value conversion request message.

Thereby, TAM' data corresponding to Handle 20 is LSB-converted as shown in 4th row and 3rd row in FIG. 14. In FIG. 14, TAM is the LSB-converted outside temperature TAM data corresponding to Handle 20, and this data is TAM data hereinafter.

Afterwards, the common packet data unit 230 issues the data update request message including the control data (Data) LSB-converted this time by the physical value conversion unit 220 and the Handle number corresponding to this control data (herein, Handle 20) to the common memory unit 210 as shown by [42] in FIG. 12.

Then, the common memory unit 210 refers the first table (FIG. 4) in the table storage unit 500 to thereby acquire the common memory address ($FFFF0010) and the common memory size (2 bytes) corresponding to the Handle number (Handle 20) transmitted together with the data update request message, and furthermore writes the data (Data) transmitted together with the data update request message in the 2 bytes area having the head at the address $FFFF0010 of the common memory based on the acquired common memory address and common memory size. Thereby, as shown in 3rd row and 2nd row in FIG. 14, the updated LSB-converted TAM data corresponding to Handle 20 is written in the common memory.

Next, the common packet data unit 230 issues the physical value conversion request message including the next control data (Data') among the control data obtained by decomposition of the common packet data and the Handle number corresponding to this control data (herein, Handle 21) to the physical value conversion unit 220 as shown by [43] in FIG. 12.

Then, the physical value conversion unit 220 refers the first table (FIG. 4) in the table storage unit 500 to thereby acquire the LSB conversion call address corresponding to Handle 21 as shown by [44] in FIG. 12 in the same manner as in the case of the transmission of the Handle 20, and activates the program stored in the LSB conversion call address acquired as described above to thereby apply LSB conversion to the data (Data') of Handle 21 transmitted together with the physical value conversion request message in the process [45] in FIG. 12.

Thereby, the AC' data corresponding to Handle 21 is LSB-converted as shown in 4th row and 3rd row in FIG. 14. In FIG. 14, AC is the LSB-converted air conditioner control data AC corresponding to Handle 21, and the data is AC data hereinafter.

Afterwards, as shown by [46] in FIG. 12, the common packet data unit 230 issues the data update request message including the control data (Data) LSB-converted this time by the physical value conversion unit 220 and the Handle number corresponding to the control data (herein, Handle 21) to the common memory unit 210 in the same manner as in the case of [42].

Then, the common memory unit 210 refers the first table (FIG. 4) in the table storage unit 500 to thereby acquire the common memory address ($FFFF0012) and the common memory size (1 byte) corresponding to Handle 21, and writes the data (Data) transmitted together with the data update request message in the 1 byte area having the head at the address $FFFF0012 of the common memory based on the common memory address and the common memory size that have been acquired in the same manner as in the case that the Handle 20 is transmitted. Thereby, the updated LSB-converted AC data corresponding to Handle 21 is written in the common memory as shown in 3rd row and 2nd row in FIG. 14.

Though not shown in the figure, the same processes as [39] to [42] and [43] to [46] shown in FIG. 12 are performed on each other control data obtained by decomposing the common packet data in the process [38], each control data is LSB-converted, and the updated LSB-converted control data is written in the common memory.

The reason why the control data transmitted from the external is LSB-converted and written in the common memory is the same as the reason applied in the case that the control data obtained by the application unit 100 of the first microcomputer 60 is transmitted to the external, and that the data length of the control data transmitted from the external should be converted to the data length corresponding to the data accuracy employed by the application unit 100 of the first microcomputer 60.

On the other hand, when the application unit 100 (in detail, each application software of the application unit 100) uses the control data written in the common memory as described above in control arithmetic operation, the application unit 100 and the common memory unit 210 operate as shown in FIG. 13. FIG. 13 shows an example in which the engine application software 110 of the application unit 100 uses the TAM data acquired from the air conditioner ECU 4 in the arithmetic operation.

For example, in the process step in which the engine application software 110 in the application unit 100 reads out the TAM data (outside temperature TAM data) that is one of the external common data from the common memory, the engine application software 110 of the application unit 100 issues the data read out request message to the common memory unit 210 as shown by [47] in FIG. 13. At that time, both information of the Handle number of the TAM data (in the present example, Handle 20) and the storage address of the TAM data in the engine application software 110 (that is, the address in the control data memory area where the TAM data is written or read out when the engine application software 110 performs arithmetic operation for controlling, in the present example, &TAM) are transmitted to the common memory unit 210.

In the case that the process for issuing the data read out request message is programmed in C-language, the issue message command for reading out the TAM data from the common memory is described as shown herein under.

Read (Handle 20, &TAM)

This command has a meaning that the data corresponding to the Handle number (Handle 20) of the TAM data is read out and the data is stored in &TAM.

In the case that an application software 110, 120, or 130 of the application unit 100 reads out the data other than the TAM data from the common memory, "Handle 20" among the commands is regarded as the Handle number of the data to be read out, and &TAM among the control data memory area provided for the application software is regarded as the address of the memory area that is set to store the data to be read out.

Further, upon receiving the message from the application unit 100 (engine application software 110), the common memory unit 210 refers to the first table (FIG. 4) in the table storage unit 500 to thereby acquire the common memory address and the common memory size corresponding to the Handle number (Handle 20) transmitted together with the message as the common memory information as shown by [48] in FIG. 13.

Then, the common memory unit 210 recognizes that the TAM data is stored in 2 bytes area having the head at the address $FFFF0010 in the common memory based on the common memory information acquired as described above, and copies the TAM data stored in 2 bytes area having the head at the address $FFFF0010 of the common memory on the storage address (&TAM) of the TAM data in the engine application software 110 in the process [49] in FIG. 13.

Because of the copy operation, the TAM data in the common memory is provided to the engine application software 110 as shown with the upward arrow between the 2nd row and 1st row in FIG. 14. In [49] shown in FIG. 13, the copy operation is described as "inform the data of the common memory".

Though not shown in the figure, the control data other than the TAM data in the common memory is also provided to each application software of the application unit 100 in the same manner as that shown in FIG. 13.

For example, in the case that the engine application software 110 of the application unit 100 reads out the SPD data calculated by the ECT application software 120 from the common memory, and in the case that the ECT application software 120 reads out the Ne data calculated by the engine application software 110 from the common memory, the same process as that shown in FIG. 13 is performed.

Furthermore, the case in which the communication data transmitted through the multiple communication line 10 is received is described above, but in the case that the communication data transmitted from the attitude control ECU 8 through the serial communication line 11 or the communication data transmitted from the second microcomputer 62 through the communication line 68 is received, the same conversion process operations as those shown in FIG. 11 to FIG. 13 are performed.

In the present embodiment, each application software 110, 120, or 130 of the application unit 100 among programs stored in the ROM of the first microcomputer 60 corresponds to the application program, the communication conversion unit 200 corresponds to the data conversion program, and the communication units 310, 320, and 330 of the communication driver unit 300 are corresponds to the communication driver program.

In data transmission, the common packet data unit 230 corresponds to the common packet data generation program module, the communication data conversion unit 240 corresponds to the communication data conversion program module, and the physical value conversion unit 220 corresponds to the physical value conversion program module.

In data reception, the communication data conversion unit 240 corresponds to the first program module, the common packet data unit 230 corresponds to the second program module, and the physical value conversion unit 220 corresponds to the physical value conversion program module.

Furthermore, in the table storage unit 500 in the ROM, the area where the first table shown in FIG. 4 is stored corresponds to the common packet data information memory means, and the area where the second table shown in FIG. 5 is stored corresponds to the conversion information memory means.

The "common memory address" and "common memory size" defined by the first table correspond to the information of the place where the control data is stored, and "common packet data size" and the "common packet data position" defined by the first table correspond to the location position information.

The "communication system", "common packet data message length", "individual packet data message length", and "header information" defined by the second table correspond to the conversion information.

As described above, in the first microcomputer 60 of the present embodiment, the independent communication conversion unit 200 and communication driver unit 300 other than the application unit 100 (application software 110 to 130) perform the process for converting the control data to be transmitted to the communication target to the communication data string corresponding to the communication protocol, the process for transmitting the communication data string to the transmission target according to the communication protocol, the process for receiving and acquiring the communication data string transmitted from the communication target according to the communication protocol, and the process for extracting the control data from the acquired communication data string based on the communication protocol and for writing the control data in the common memory.

As a result, it is not necessary to modify the application unit 100 even when the communication protocol is changed, or the type and data length of the control data to be communicated with the communication target or the arrangement of each control data in the communication data string are changed concomitantly with the system structure change.

Particularly in the first microcomputer 60 of the present invention, the communication conversion unit 200 is divided into the common memory unit 210, the physical value conversion unit 220, the common packet data unit 230, and the communication data conversion unit 240. The common packet data unit 230 performs extraction of the control data to be transmitted and generation of the common packet based on each information defined by the first table in the table storage unit 500, and performs decomposition of the common packet data composed of the transmitted control data and writing of the each control data obtained by decomposition in the common memory. The communication data conversion unit 240 performs, based on each information defined by the second table in the table storage unit 500, conversion of the data to the communication data string corresponding to the communication protocol of the common packet data and conversion of the received communication data string (the received data string dependent on the communication protocol) to the common packet data.

As a result, the change of the type and data length of the control data to be communicated with the communication target or the arrangement of each control data in the communication data string concomitant with the system structure change can be accommodated without change of the program of a layer including the application unit 100, only by changing each information defined by the first table. The change of the communication protocol can be accommodated only by changing the communication driver unit 300 correspondingly to the communication protocol and by changing each information defined by the second table.

In the first microcomputer 60 of the present embodiment, the physical value conversion unit 220, which is provided separately from the application unit 100, performs LSB conversion process to matching the data length of the control data with that of the communication target, the application software 110 to 130 of the application unit 100 are not restricted by the data length employed by the communication target, and the application software 110 to 130 are independent of the communication target.

Furthermore, in the first microcomputer 60 of the present embodiment, since the control data is used commonly among the application software 110 to 130 by way of the common memory provided separately, for example, even when an application software is replaced with another different application software due to control target change, other application software is not affected. That is, the application software 110 to 130 are separated each other, and the replacement of the application software and the diversion to another system structure are easy.

On the other hand, in the first microcomputer 60 of the present embodiment, since the common packet data of the transmission target is generated by combining each control data calculated respectively by a plurality of application software 110 to 130 in the data transmission, various diversified control data relative to a plurality of application software can be transmitted to the communication target in one communication, and as a result the very efficient data communication is realized.

One embodiment of the present invention is described above, but the present invention is by no means limited by the embodiment described above, and of course various modifications may be applied.

For example, in the first microcomputer 60 of the embodiment, the case in which the process of the common packet data unit 230 depends on the information defined by the first table shown in FIG. 4 and the process of the communication data conversion unit 240 depends on the information defined by the second table shown in FIG. 5 is described above, but processes of the common packet data unit 230 and the communication data conversion unit 240 may be the fixed process that refers neither the first table nor the second table.

In such case, though the effect is rather poor, for example, in the case that the type and data length of the control data to be communicated with the communication target or the arrangement of each control data in the communication data string are changed, the change can be accommodated only by modifying the common packet data unit 230. In the case that the communication protocol is changed, the change can be accommodated only by modifying the communication data conversion unit 240 and the communication driver unit 300, that is, only by partly modifying the communication conversion unit.

On the other hand, in the embodiment, since the first microcomputer 60 is served for performing the DMA communication with the second microcomputer 62 through the communication line 68, the serial communication with the attitude control ECU 8 through the serial communication line 11, and the multiple communication with the air conditioner ECU 4 and the meter ECU 6 through the multiple communication line 10, respective communication driver programs corresponding to three types of communication protocols that is, the DMA communication unit 310, the serial communication unit 320, and the multiple communication unit 330 are incorporated in the communication driver unit 300.

To simplify the structure, for example, if the first microcomputer 60 is served only for the serial communication, the communication driver unit 300 is composed only of the serial communication unit 320, and the information defined by the first and second tables may be rewritten only to the information corresponding to the serial communication with the communication target.

In detail, the communication driver program corresponding to the communication protocol to be used actually is incorporated in the communication driver unit 300, the information defined by the first table is set correspondingly to the type and data length of the control data to be communicated with the communication target and the arrangement in the communication data string, and the information defined by the second table is set correspondingly to the communication protocol to be actually used, as a result various system structures and the data communication according to various communication protocols can be accommodated without changing the application unit 100 and program modules (objects) of each layer other than the communication driver unit 330 shown in FIG. 3.

The present invention having been described above may be implemented in other ways without departing from the spirit of the invention.

What is claimed is:

1. An automobile control unit comprising a microcomputer for performing arithmetic operation for controlling a control target mounted on an automobile by executing a program stored in a memory medium and for performing a process for transmitting any one of control data calculated by means of the arithmetic operation to a plurality of communication targets respectively using a plurality of communication protocols;

wherein the program in the memory medium includes:
an application program for performing the arithmetic operation irrespective of the types of said communication protocols;
a data conversion program, which is provided in addition to the application program, for extracting the control data to be transmitted to a specific communication target of said plurality of communication targets from among the control data calculated by means of the application program and for performing the process for converting extracted control data to a communication data string corresponding to a specified communication protocol of the plurality of said communication protocols that is determined by the specific communication target of said plurality of communication targets;
a communication driver program, which is provided in addition to the data conversion program and the application program, for performing the process for transmitting the communication data string converted by means of the data conversion program to the specific communication target of said plurality of communication targets according to the specified communication protocol; and
said application program, said data conversion program and said communication driver program are stored independently of each other in said memory medium.

2. An automobile control unit of claim 1, wherein the data conversion program includes:
a common packet data generation program module for extracting the control data to be transmitted to the specific communication target from among the control data calculated by means of the application program and for performing a process for generating a common packet data that is a data string not dependent on any of the communication protocols by arranging the extracted control data in the order predetermined by the communication protocol of the specific communication target; and
a communication data conversion program module for performing a process for converting the common packet data generated by means of the common packet data generation program module to the communication data string corresponding to the specified communication protocol.

3. An automobile control unit of claim 2, wherein:
the control target includes a first control target and a second control target;
the application program includes a first application program for performing the arithmetic operation for controlling the first control target and a second application program for performing the arithmetic operation for controlling the second control target; and
the common packet data generation program module is structured so as to generate the common packet data by means of the process in which the control data to be transmitted to the specific communication target is extracted from among the control data calculated by means of the first application program, other control data to be transmitted to the specific communication target is extracted from among the control data calculated by means of the second application program, and the extracted control data is arranged in the order predetermined by the specific communication target.

4. An automobile control unit of claim 2, wherein:
the data conversion program is additionally provided with a physical value conversion program module for converting data length of the control data extracted by means of the common packet data generation program module to the data length that is handled by a specific communication target side; and the common packet data generation program module is structured so as to generate the common packet data by arranging the control data having the data length that has been converted by the physical value conversion program module in the order determined previously by the specific communication target.

5. An automobile control unit of claim 2, wherein:

the unit is provided with a common packet data information memory means for correspondingly storing storage place information of the control data that is a component of the common packet data and location position information for indicating a place where the control data is located in the common packet data; and the common packet data generation program module is structured so as to extract the control data to be transmitted to the specific communication target based on the storage place information stored in the common packet data information memory means and to generate the common packet data based on the location position information stored in the common packet data information memory means.

6. An automobile control unit of claim 2, wherein:

the automobile control unit is provided with a conversion information memory means that stores conversion information for converting the common packet data to the communication data string corresponding to the specified communication protocol; and the communication data conversion program module is structured so as to convert the common packet data generated by means of the common packet data generation program module to the communication data string corresponding to the specified communication protocol based on the conversion information stored in the conversion information memory means.

7. An automobile control unit of claim 1, wherein:

the control target comprises a first control target and a second control target;

the application program comprises a first application program for performing an arithmetic operation for controlling the first control target and a second application program for performing the arithmetic operation for controlling the second control target;

the unit is provided with a common memory, which is provided in addition to memory means, for storing the control data used commonly for the first application program and the second application program and for storing all the control data used for controlling the control target of the first and second application programs by the first and second application programs;

the first and second application programs are structured so that an application program that calculates and provides the control data to be used commonly writes the control data in the common memory, and another application program that is provided with the control data reads out the control data from the common memory; and the data conversion program includes a common packet data generation program module for performing the process for generating the common packet data that is not dependent on any of the communication protocols by means of the process in which the control data to be transmitted to the specific communication target is extracted from among the control data stored in the common memory and the extracted control data is arranged in the order determined previously by the specific communication target, and the communication data conversion program module for converting the common packet data generated by the common packet data generation program module to the communication data string corresponding to the specific communication protocol.

8. An automobile control unit of claim 1, wherein the data conversion program arranges the extracted control data in an order determined by the communication protocol of the specific target.

9. An automobile control unit of claim 1, wherein the data conversion program is revisable to accommodate changes in the communication protocols without revising the application program.

10. An automobile control unit comprising a microcomputer for performing a process for receiving a communication data string transmitted from a specific communication target of a plurality of communication targets by executing a program stored in a memory medium and for performing arithmetic operation for controlling a control target mounted on an automobile by using control data included in the communication data string received by the process, wherein the program in the memory medium includes:

a communication driver program for performing a process for receiving and acquiring a communication data string transmitted from the specific communication target of said plurality of communication targets according to a specified communication protocol of a plurality of communication protocols determined by the specific communication target;

a data conversion program, which is provided in addition to the communication driver program, for performing a process for extracting the control data from among the communication data string acquired by the communication driver program based on the specified communication protocol of said plurality of communication protocols, and for writing extracted control data in the predetermined memory area prepared for storing the control data;

an application program, which is provided in addition to the data conversion program and the communication driver program, for reading out the control data stored in a predetermined memory area and for performing the arithmetic operation by read out control data irrespective of the types of said communication protocols; and said application program, said data conversion program and said communication driver program are stored independently of each other in said memory medium.

11. An automobile control unit of claim 10, wherein:

a plurality of types of control data is included in the communication data string transmitted from the specific communication target in the predetermined order; and the data conversion program includes a first program module for performing a process for converting the communication data string acquired by the communication driver program to common packet data that is a data string in which a plurality of types of control data is arranged in the order of transmission from first transmitted control data based on the specified communication protocol, and a second program module for performing a process for decomposing the common packet data converted by the first program module into a plurality of types of control data and for writing the decomposed control data on respective memory areas prepared for storing the control data.

12. An automobile control unit of claim 11, wherein:
the data conversion program is additionally provided with a physical value conversion program module for converting data length of the control data decomposed from the common packet data by the second program module to the data length handled by the application program; and
the second program module is structured so as to write the control data having the data length that has been converted by the physical value conversion program module in respective corresponding memory areas.

13. An automobile control unit of claim 11, wherein:
the automobile control unit is provided with a common packet data information memory means that correspondingly stores location position information for indicating a location position in the common packet data and storage place information of the control data; and
the second program module is structured so as to decompose the common packet data to the control data based on the location position information stored in the common packet data information memory means and so as to write the control data in the respective memory areas based on the storage place information stored in the common packet data information memory means.

14. An automobile control unit of claim 11, wherein:
the automobile control unit is provided with a conversion information memory means that stores conversion information for converting the communication data string acquired by the communication driver program to the common packet data; and
the first program module is structured so as to convert the communication data string acquired by the communication driver program to the common packet data based on the conversion information stored in the conversion information memory means.

15. An automobile control unit of claim 10, wherein the data conversion program is revisable to accommodate changes in the communication protocols without revising the application program.

16. An automobile control unit comprising a microcomputer for performing arithmetic operation for controlling control target mounted on an automobile by executing a program stored in a memory medium and for transmitting any one of control data calculated by means of the arithmetic operation to a plurality of communication targets respectively using a plurality of communication protocols,
wherein the program in the memory medium includes a software structure which has:
an application unit that stores an application program for performing arithmetic operation irrespective of the types of said communication protocols;
a common packet data unit for extracting control data to be transmitted to a specific communication target of said plurality of communication targets for among the control data calculated by the application program and for storing a process program for generating common packet data that is a data string that is not dependent on a communication protocol by arranging extracted control data in the order previously determined by the communication protocol of the specific communication target;
a communication data conversion unit that stores a process program for converting the common packet data to the communication data string corresponding to a specified communication protocol of the plurality of said communication protocols determined by the specific communication target;
a communication driver unit that stores a process program for transmitting the communication data string converted by the communication data conversion unit to the specific communication target; and
said application program, said process program for generating common packet data, and said process program for transmitting the communication data string are stored independently of each other on said memory medium.

17. The automobile control unit of claim 16, wherein the process programs for generating common packet data and converting the common packet data are revisable to accommodate changes in the communication protocols without revising the application program.

18. An automobile control unit comprising a microcomputer for performing arithmetic operation for controlling a control target mounted on an automobile by executing a program stored in a memory medium and for performing a process for transmitting any one of control data calculated by means of the arithmetic operation to a communication target;
wherein the program in the memory medium includes:
an application program for performing the arithmetic operation;
a data conversion program, which is provided in addition to the application program, for extracting the control data to be transmitted to the communication target from among the control data calculated by means of the application program and for performing the process for converting extracted control data to a communication data string corresponding to a specified communication protocol determined by the communication target;
a communication driver program, which is provided in addition to the data conversion program and the application program, for performing the process for transmitting the communication data string converted by means of the data conversion program to the communication target according to the specified communication protocol;
the data conversion program includes a common packet data generation program module for extracting the control data to be transmitted to the communication target from among the control data calculated by means of the application program and for performing a process for generating a common packet data that is a data string not dependent on the communication protocol by arranging the extracted control data in the order predetermined by the communication target;
the data conversion program also includes a communication data conversion program module for performing a process for converting the common packet data generated by means of the common packet data generation program module to the communication data string corresponding to the specified communication protocol;
the control target includes a first control target and a second control target;
the application program includes a first application program for performing the arithmetic operation for controlling the first control target and a second application program for performing the arithmetic operation for controlling the second control target; and the common packet data generation program module is structured so as to generate the common packet data by means of the process in which the control data to be transmitted to the communication target is extracted from among the control data calculated by means of the first application program, other control data to be transmitted to the communication target is extracted from among the control data calculated by means of the second application program, and the extracted control data is arranged in the order predetermined by the communication target.

19. An automobile control unit comprising a microcomputer for performing arithmetic operation for controlling a control target mounted on an automobile by executing a program stored in a memory medium and for performing a process for transmitting any one of control data calculated by means of the arithmetic operation to a communication target;

wherein the program in the memory medium includes:
an application program for performing the arithmetic operation;
a data conversion program, which is provided in addition to the application program, for extracting the control data to be transmitted to the communication target from among the control data calculated by means of the application program and for performing the process for converting extracted control data to a communication data string corresponding to a specified communication protocol determined by the communication target;
a communication driver program, which is provided in addition to the data conversion program and the application program, for performing the process for transmitting the communication data string converted by means of the data conversion program to the communication target according to the specified communication protocol;
the control target comprises a first control target and a second control target;
the application program comprises a first application program for performing an arithmetic operation for controlling the first control target and a second application program for performing the arithmetic operation for controlling the second control target;
the unit is provided with a common memory, which is provided in addition to memory means, for storing the control data used commonly for the first application program and the second application program and for storing all the control data used for controlling the control target of the first and second application programs by the first and second application programs;
the first and second application programs are structured so that an application program that calculates and provides the control data to be used commonly writes the control data in the common memory, and another application program that is provided with the control data reads out the control data from the common memory; and
the data conversion program includes a common packet data generation program module for performing the process for generating the common packet data that is not dependent on the communication protocol by means of the process in which the control data to be transmitted to the communication target is extracted from among the control data stored in the common memory and the extracted control data is arranged in the order determined previously by the communication target, and the communication data conversion program module for converting the common packet data generated by the common packet data generation program module to the communication data string corresponding to the specific communication protocol.

20. An automobile control unit comprising a microcomputer for performing a process for receiving a communication data string transmitted from a communication target by executing a program stored in a memory medium and for performing arithmetic operation for controlling a control target mounted on a automobile by using control data included in the communication data string received by the process, wherein the program in the memory medium includes:
a communication driver program for performing a process for receiving and acquiring a communication data string transmitted from the communication target according to a specified communication protocol determined by the communication target;
a data conversion program, which is provided in addition to the communication driver program, for performing a process for extracting the control data from among the communication data string acquired by the communication driver program based on the specified communication protocol, and for writing extracted control data in the predetermined memory area prepared for storing the control data;
an application program, which is provided in addition to the data conversion program and the communication driver program, for reading out the control data stored in a predetermined memory area and for performing the arithmetic operation by read out control data;
a plurality of types of control data is included in the communication data string transmitted from the communication target in the predetermined order; and
the data conversion program includes a first program module for performing a process for converting the communication data string acquired by the communication driver program to common packet data that is a data string in which a plurality of types of control data is arranged in the order of transmission from first transmitted control data based on the specified communication protocol, and a second program module for performing a process for decomposing the common packet data converted by the first program module into a plurality of types of control data and for writing the decomposed control data on respective memory areas prepared for storing the control data.

21. An automobile control unit of claim 20, wherein:
the data conversion program is additionally provided with a physical value conversion program module for converting data length of the control data decomposed from the common packet data by the second program module to the data length handled by the application program; and
the second program module is structured so as to write the control data having the data length that has been converted by the physical value conversion program module in respective corresponding memory areas.

22. An automobile control unit of claim 20, wherein:

the automobile control unit is provided with a common packet data information memory means that correspondingly stores location position information for indicating a location position in the common packet data and storage place information of the control data; and the second program module is structured so as to decompose the common packet data to the control data based on the location position information stored in the common packet data information memory means and so as to write the control data in the respective memory areas based on the storage place information stored in the common packet data information memory means.

23. An automobile control unit of claim 20, wherein:

the automobile control unit is provided with a conversion information memory means that stores conversion information for converting the communication data string acquired by the communication driver program to the common packet data; and the first program module is structured so as to convert the communication data string acquired by the communication driver program to the common packet data based on the conversion information stored in the conversion information memory means.

\* \* \* \* \*